United States Patent
Palermo et al.

(10) Patent No.: US 12,248,783 B2
(45) Date of Patent: *Mar. 11, 2025

(54) FREQUENCY SCALING FOR PER-CORE ACCELERATOR ASSIGNMENTS

(71) Applicant: Intel Corporation, Santa Clara, CA (US)

(72) Inventors: Stephen T. Palermo, Chandler, AZ (US); Srihari Makineni, Portland, OR (US); Shubha Bommalingaiahnapallya, East Brunswick, NJ (US); Neelam Chandwani, Portland, OR (US); Rany T. Elsayed, Folsom, CA (US); Udayan Mukherjee, Portland, OR (US); Lokpraveen Mosur, Gilbert, AZ (US); Adwait Purandare, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,082

(22) Filed: Sep. 15, 2023

(65) Prior Publication Data

US 2024/0111531 A1  Apr. 4, 2024

Related U.S. Application Data

(63) Continuation of application No. 16/933,369, filed on Jul. 20, 2020, now Pat. No. 11,775,298.

(Continued)

(51) Int. Cl.
*G06F 1/3203* (2019.01)
*G06F 9/30* (2018.01)
*G06F 9/38* (2018.01)

(52) U.S. Cl.
CPC ........ *G06F 9/30036* (2013.01); *G06F 9/3887* (2013.01); *G06F 9/3888* (2023.08)

(58) Field of Classification Search
None
See application file for complete search history.

(56) References Cited

U.S. PATENT DOCUMENTS 5,461,266 A * 10/1995 Koreeda ................. G06F 1/324
  713/322
6,549,999 B2 * 4/2003 Kishida ............... G06F 9/30167
  711/212

(Continued)

FOREIGN PATENT DOCUMENTS

EP  1197847 A2  4/2002

OTHER PUBLICATIONS

Anonymous: "SPARC Assembly/SPARC Instructions—Wikibooks, open books for an open world", Nov. 5, 2013 (Nov. 5, 2013), pp. 1-3, XP055917843, Retrieved from the Internet: URL:https://en.wikibooks.org/w/index.php?title=SPARC_Assembly/ SPARC Instructions&oldid=2578882 [retrieved on May 3, 2022], 8 pages.

(Continued)

*Primary Examiner* — Hyun Nam
(74) *Attorney, Agent, or Firm* — Nicholson De Vos Webster & Elliott LLP

(57) ABSTRACT

Methods for frequency scaling for per-core accelerator assignments and associated apparatus. A processor includes a CPU (central processing unit) having multiple cores that can be selectively configured to support frequency scaling and instruction extensions. Under this approach, some cores can be configured to support a selective set of AVX instructions (such as AVX3/5G-ISA instructions) and/or AMX instructions, while other cores are configured to not support these AVX/AMX instructions. In one aspect, the selective AVX/AMX instructions are implemented in one or more (Continued)

ISA extension units that are separate from the main processor core (or otherwise comprises a separate block of circuitry in a processor core) that can be selectively enabled or disabled. This enables cores having the separate unit(s) disabled to consume less power and/or operate at higher frequencies, while supporting the selective AVX/AMX instructions using other cores. These capabilities enhance performance and provides flexibility to handle a variety of applications requiring use of advanced AVX/AMX instructions to support accelerated workloads.

24 Claims, 15 Drawing Sheets

Related U.S. Application Data

(60) Provisional application No. 63/015,083, filed on Apr. 24, 2020.

(56) References Cited

U.S. PATENT DOCUMENTS

| | | | | |
|---|---|---|---|---|
| 11,405,946 | B2* | 8/2022 | Babaei | H04L 5/001 |
| 2005/0193382 | A1* | 9/2005 | Goring | G06F 8/65 |
| | | | | 717/162 |
| 2006/0174151 | A1* | 8/2006 | Lin | G06F 1/3243 |
| | | | | 713/300 |
| 2008/0072216 | A1* | 3/2008 | Zhao | G06F 8/427 |
| | | | | 717/143 |
| 2008/0275828 | A1* | 11/2008 | Payton | G06F 11/30 |
| | | | | 706/16 |
| 2008/0291995 | A1* | 11/2008 | Graham | H04N 19/156 |
| | | | | 375/E7.137 |
| 2011/0225436 | A1* | 9/2011 | Beard | G06F 1/324 |
| | | | | 713/310 |
| 2012/0117403 | A1* | 5/2012 | Bieswanger | G06F 1/324 |
| | | | | 713/322 |
| 2013/0268742 | A1* | 10/2013 | Yamada | G06F 9/5044 |
| | | | | 712/226 |
| 2013/0311758 | A1* | 11/2013 | Caprioli | G06F 9/4552 |
| | | | | 712/233 |
| 2015/0220345 | A1* | 8/2015 | Corbal | G06F 9/3836 |
| | | | | 712/214 |
| 2017/0168546 | A1* | 6/2017 | Meswani | G06F 1/3243 |
| 2017/0242696 | A1* | 8/2017 | Kidd | G06F 9/30181 |
| 2018/0095751 | A1* | 4/2018 | Aminot | G06F 9/30014 |
| 2018/0324979 | A1* | 11/2018 | North | G06F 1/20 |
| 2019/0004585 | A1* | 1/2019 | Halverson | G06F 1/3206 |
| 2019/0042244 | A1* | 2/2019 | Henry | G06F 7/5324 |
| 2019/0068731 | A1* | 2/2019 | Spicer | H04L 67/55 |
| 2019/0196827 | A1* | 6/2019 | Madduri | G06F 17/16 |
| 2019/0347125 | A1* | 11/2019 | Sankaran | G06F 9/3004 |
| 2020/0104126 | A1* | 4/2020 | Pearce | G06F 9/30036 |
| 2020/0220759 | A1* | 7/2020 | Katzav | H04L 27/2626 |
| 2020/0310809 | A1* | 10/2020 | Hughes | G06F 9/30036 |
| 2020/0310872 | A1* | 10/2020 | Jambur Sathyanarayana | |
| | | | | G06F 9/3842 |
| 2021/0026708 | A1* | 1/2021 | Weissmann | G06F 1/08 |
| 2021/0303357 | A1* | 9/2021 | Varma | G06F 1/324 |
| 2021/0334101 | A1* | 10/2021 | Palermo | G06F 9/3887 |
| 2022/0231701 | A1* | 7/2022 | Furtek | H03M 13/616 |
| 2023/0068290 | A1* | 3/2023 | Li | G06F 9/384 |
| 2023/0195199 | A1* | 6/2023 | Chidambaram | G06F 1/3296 |
| | | | | 713/322 |

OTHER PUBLICATIONS

European First Office Action, (EP Exam Report Article 94(3) EPC), for Patent Application No. 2024598.3, dated May 11, 2022, 8 pages.
European Search Report and Search Opinion, EP App. No. 20214598.3, Jun. 16, 2021, 11 pages.
European Second Office Action, (EP Exam Report Article 94(3) EPC), for Patent Application No. 2024598.3, dated Sep. 29, 2022, 4 pages.
Final Office Action, U.S. Appl. No. 16/933,369, Jan. 14, 2022, 17 pages.
Final Office Action, U.S. Appl. No. 16/933,369, Mar. 9, 2023, 22 pages.
Ian Matthews, "SOLVED: What is Intel AVX-512?", Nov. 2, 2017, Urtech.ca (Year: 2017).
Non-Final Office Action, U.S. Appl. No. 16/933,369, Aug. 22, 2022, 22 pages.
Non-Final Office Action, U.S. Appl. No. 16/933,369, Jul. 21, 2021, 10 pages.
Notice of Allowance, U.S. Appl. No. 16/933,369, Jun. 14, 2023, 3 pages.
Notice of Allowance, U.S. Appl. No. 16/933,369, May 25, 2023, 10 pages.
Office Action, CN App. No. 202011516266.3, Apr. 24, 2023, 2 pages (1 page of English Translation and 1 page of original document).
Office Action, EP App. No. 20214598.3, Apr. 5, 2024, 04 pages.
Office Action, EP App. No. 20214598.3, May 11, 2022, 8 pages.
Office Action, EP App. No. 20214598.3, Nov. 29, 2023, 7 pages.
Office Action, EP App. No. 20214598.3, Sep. 29, 2022, 4 pages.
Serres et al.: "An Architecture for Reconfigurable Multi-core Explorations", Reconfigurable Computing and FPGAS (Reconfig), 2011 International Conference On, IEEE, Nov. 30, 2011, 6 pages.
Thermal Design Power (TDP) in Intel Processors, Nov. 21, 2019, Intel (Year: 2019).

* cited by examiner

Core Frequency Table: 32C 185W - 8/24

| Freq (GHz) | 1.0 | 1.1 | 1.2 | 1.3 | 1.4 | 1.5 | 1.6 | 1.7 | 1.8 | 1.9 | 2.0 | 2.1 | 2.2 | 2.3 | 2.4 | 2.5 |
|---|---|---|---|---|---|---|---|---|---|---|---|---|---|---|---|---|
| 1.0 | 135 | 139 | 144 | 149 | 154 | 160 | 165 | 171 | 177 | 183 | 189 | 196 | 202 | 209 | 216 | 223 |
| 1.1 | 136 | 140 | 145 | 150 | 155 | 160 | 166 | 172 | 178 | 184 | 190 | 196 | 203 | 210 | 217 | 224 |
| 1.2 | 137 | 141 | 146 | 151 | 156 | 161 | 167 | 173 | 179 | 185 | 191 | 197 | 204 | 211 | 218 | 225 |
| 1.3 | 138 | 142 | 147 | 152 | 157 | 162 | 168 | 174 | 179 | 186 | 192 | 198 | 205 | 212 | 219 | 226 |
| 1.4 | 139 | 143 | 148 | 153 | 158 | 163 | 169 | 175 | 180 | 187 | 193 | 199 | 206 | 213 | 220 | 227 |
| 1.5 | 140 | 144 | 149 | 154 | 159 | 164 | 170 | 176 | 181 | 188 | 194 | 200 | 207 | 214 | 221 | 228 |
| 1.6 | 141 | 145 | 150 | 155 | 160 | 165 | 171 | 177 | 183 | 189 | 195 | 201 | 208 | 215 | 222 | 229 |
| 1.7 | 142 | 146 | 151 | 156 | 161 | 166 | 172 | 178 | 184 | 190 | 196 | 202 | 209 | 216 | 223 | 230 |
| 1.8 | 143 | 147 | 152 | 157 | 162 | 168 | 173 | 179 | 185 | 191 | 197 | 203 | 210 | 217 | 224 | 231 |
| 1.9 | 144 | 148 | 153 | 158 | 163 | 169 | 174 | 180 | 186 | 192 | 198 | 205 | 211 | 218 | 225 | 232 |
| 2.0 | 145 | 150 | 154 | 159 | 165 | 170 | 175 | 181 | 187 | 193 | 199 | 206 | 212 | 219 | 226 | 233 |
| 2.1 | 146 | 151 | 156 | 161 | 166 | 171 | 177 | 182 | 188 | 194 | 200 | 207 | 214 | 220 | 227 | 235 |
| 2.2 | 147 | 152 | 157 | 162 | 167 | 172 | 178 | 183 | 189 | 195 | 202 | 208 | 215 | 222 | 229 | 236 |
| 2.3 | 149 | 153 | 158 | 163 | 168 | 173 | 179 | 185 | 191 | 197 | 203 | 209 | 216 | 223 | 230 | 237 |
| 2.4 | 150 | 154 | 159 | 164 | 169 | 175 | 180 | 186 | 192 | 198 | 204 | 211 | 217 | 224 | 231 | 238 |
| 2.5 | 151 | 156 | 161 | 166 | 171 | 176 | 182 | 187 | 193 | 199 | 205 | 212 | 219 | 225 | 232 | 240 |
| 2.6 | 153 | 157 | 162 | 167 | 172 | 177 | 183 | 189 | 194 | 200 | 207 | 213 | 220 | 227 | 234 | 241 |
| 2.7 | 154 | 158 | 163 | 168 | 173 | 179 | 184 | 190 | 196 | 202 | 208 | 215 | 221 | 228 | 235 | 242 |
| 2.8 | 155 | 160 | 165 | 170 | 175 | 180 | 186 | 191 | 197 | 203 | 209 | 216 | 223 | 229 | 236 | 244 |

Rows: SSE Frequency; Columns: AVX3 Frequency

*Fig. 2*

Core Frequency Table: 32C 185W - 16/16

SSE Frequency (rows) × AVX3 Frequency (columns)

| Freq (GHz) | 1.0 | 1.1 | 1.2 | 1.3 | 1.4 | 1.5 | 1.6 | 1.7 | 1.8 | 1.9 | 2.0 | 2.1 | 2.2 | 2.3 | 2.4 | 2.5 |
|---|---|---|---|---|---|---|---|---|---|---|---|---|---|---|---|---|
| 1.0 | 133 | 136 | 139 | 143 | 146 | 149 | 153 | 157 | 161 | 165 | 169 | 173 | 178 | 182 | 187 | 192 |
| 1.1 | 135 | 138 | 141 | 144 | 148 | 151 | 155 | 159 | 163 | 167 | 171 | 175 | 180 | 184 | 189 | 194 |
| 1.2 | 137 | 140 | 143 | 146 | 150 | 153 | 157 | 161 | 165 | 169 | 173 | 177 | 182 | 186 | 191 | 196 |
| 1.3 | 139 | 142 | 145 | 148 | 152 | 155 | 159 | 163 | 166 | 171 | 175 | 179 | 183 | 188 | 193 | 197 |
| 1.4 | 141 | 144 | 147 | 150 | 153 | 157 | 161 | 165 | 168 | 172 | 177 | 181 | 185 | 190 | 195 | 199 |
| 1.5 | 143 | 146 | 149 | 152 | 155 | 159 | 163 | 167 | 170 | 175 | 179 | 183 | 187 | 192 | 197 | 201 |
| 1.6 | 145 | 148 | 151 | 154 | 158 | 161 | 165 | 169 | 173 | 177 | 181 | 185 | 189 | 194 | 199 | 203 |
| 1.7 | 147 | 150 | 153 | 156 | 160 | 163 | 167 | 171 | 175 | 179 | 183 | 187 | 192 | 196 | 201 | 206 |
| 1.8 | 149 | 152 | 155 | 158 | 162 | 165 | 168 | 173 | 177 | 181 | 185 | 189 | 194 | 198 | 203 | 208 |
| 1.9 | 151 | 154 | 157 | 160 | 164 | 168 | 171 | 175 | 179 | 183 | 187 | 192 | 196 | 201 | 205 | 210 |
| 2.0 | 153 | 157 | 160 | 163 | 166 | 170 | 174 | 177 | 181 | 184 | 190 | 194 | 198 | 203 | 208 | 212 |
| 2.1 | 156 | 159 | 162 | 165 | 169 | 172 | 176 | 180 | 184 | 188 | 192 | 196 | 201 | 205 | 210 | 215 |
| 2.2 | 158 | 161 | 164 | 168 | 171 | 175 | 178 | 182 | 186 | 190 | 194 | 198 | 203 | 208 | 212 | 217 |
| 2.3 | 161 | 164 | 167 | 170 | 174 | 177 | 181 | 185 | 189 | 193 | 197 | 201 | 206 | 210 | 215 | 220 |
| 2.4 | 163 | 166 | 169 | 173 | 176 | 180 | 183 | 187 | 191 | 195 | 199 | 204 | 208 | 213 | 217 | 222 |
| 2.5 | 166 | 169 | 172 | 175 | 179 | 182 | 186 | 190 | 194 | 198 | 202 | 206 | 211 | 215 | 220 | 225 |
| 2.6 | 168 | 171 | 174 | 178 | 181 | 185 | 189 | 192 | 196 | 200 | 205 | 209 | 213 | 218 | 222 | 227 |
| 2.7 | 171 | 174 | 177 | 181 | 184 | 188 | 191 | 195 | 199 | 203 | 207 | 212 | 216 | 220 | 225 | 230 |
| 2.8 | 174 | 177 | 180 | 183 | 187 | 190 | 194 | 198 | 202 | 206 | 210 | 214 | 219 | 223 | 228 | 233 |

Right-side legend:
- 3.0 GHz
- 2.9 GHz
- 2.8 GHz
- 2.7 GHz — MAX All Core Turbo SSE
- 2.6 GHz
- 2.5 GHz — MAX AVX3/5G-ISA
- 2.4 GHz
- 2.3 GHz
- 2.2 GHz
- 2.1 GHz — BASE TDP Freq SSE / BASE AVX3/5G-ISA
- 1.8 GHz 16C of 32C / 16C of 32C

*Fig. 3*

Core Frequency Table: 32C 225W – 8/24

| Freq (GHz) | 1.0 | 1.1 | 1.2 | 1.3 | 1.4 | 1.5 | 1.6 | 1.7 | 1.8 | 1.9 | 2.0 | 2.1 | 2.2 | 2.3 | 2.4 | 2.5 |
|---|---|---|---|---|---|---|---|---|---|---|---|---|---|---|---|---|
| 1.0 | 135 | 139 | 144 | 149 | 154 | 160 | 165 | 171 | 177 | 183 | 189 | 196 | 202 | 209 | 216 | 223 |
| 1.1 | 136 | 140 | 145 | 150 | 155 | 160 | 166 | 172 | 178 | 184 | 190 | 196 | 203 | 210 | 217 | 224 |
| 1.2 | 137 | 141 | 146 | 151 | 156 | 161 | 167 | 173 | 179 | 185 | 191 | 197 | 204 | 211 | 218 | 225 |
| 1.3 | 138 | 142 | 147 | 152 | 157 | 162 | 168 | 174 | 179 | 186 | 192 | 198 | 205 | 212 | 219 | 226 |
| 1.4 | 139 | 143 | 148 | 153 | 158 | 163 | 169 | 175 | 180 | 187 | 193 | 199 | 206 | 213 | 220 | 227 |
| 1.5 | 140 | 144 | 149 | 154 | 159 | 164 | 170 | 176 | 181 | 188 | 194 | 200 | 207 | 214 | 221 | 228 |
| 1.6 | 141 | 145 | 150 | 155 | 160 | 165 | 171 | 177 | 183 | 189 | 195 | 201 | 208 | 215 | 222 | 229 |
| 1.7 | 142 | 146 | 151 | 156 | 161 | 166 | 172 | 178 | 184 | 190 | 196 | 202 | 209 | 216 | 223 | 230 |
| 1.8 | 143 | 147 | 152 | 157 | 162 | 168 | 173 | 179 | 185 | 191 | 197 | 203 | 210 | 217 | 224 | 231 |
| 1.9 | 144 | 148 | 153 | 158 | 163 | 169 | 174 | 180 | 186 | 192 | 198 | 205 | 211 | 218 | 225 | 232 |
| 2.0 | 145 | 150 | 154 | 159 | 165 | 170 | 175 | 181 | 187 | 193 | 199 | 206 | 212 | 219 | 226 | 233 |
| 2.1 | 146 | 151 | 156 | 161 | 166 | 171 | 177 | 182 | 188 | 194 | 200 | 207 | 214 | 220 | 227 | 235 |
| 2.2 | 147 | 152 | 157 | 162 | 167 | 172 | 178 | 183 | 189 | 195 | 202 | 208 | 215 | 222 | 229 | 236 |
| 2.3 | 149 | 153 | 158 | 163 | 168 | 173 | 179 | 185 | 191 | 197 | 203 | 209 | 216 | 223 | 230 | 237 |
| 2.4 | 150 | 154 | 159 | 164 | 169 | 175 | 180 | 186 | 192 | 198 | 204 | 211 | 217 | 224 | 231 | 238 |
| 2.5 | 151 | 156 | 161 | 166 | 171 | 176 | 182 | 187 | 193 | 199 | 205 | 212 | 219 | 225 | 232 | 240 |
| 2.6 | 153 | 157 | 162 | 167 | 172 | 177 | 183 | 189 | 194 | 200 | 207 | 213 | 220 | 227 | 234 | 241 |
| 2.7 | 154 | 158 | 163 | 168 | 173 | 179 | 184 | 190 | 196 | 202 | 208 | 215 | 221 | 228 | 235 | 242 |
| 2.8 | 155 | 160 | 165 | 170 | 175 | 180 | 186 | 191 | 197 | 203 | 209 | 216 | 223 | 229 | 236 | 244 |

SSE Frequency (rows) / AVX3 Frequency (columns)

MAX All Core Turbo SSE

BASE TDP Freq SSE 3.0 GHz | 2.9 GHz | 2.8 GHz | 2.7 GHz | 2.6 GHz — MAX AVX3/5G-ISA | 2.5 GHz | 2.4 GHz | 2.3 GHz — BASE AVX3/5G-ISA | 2.2 GHz | 2.1 GHz | 2.0 GHz

Core Frequency Table: 32C 225W - 16/16

| Freq (GHz) | AVX3 Frequency | | | | | | | | | | | | | | | |
|---|---|---|---|---|---|---|---|---|---|---|---|---|---|---|---|---|
| | 1.0 | 1.1 | 1.2 | 1.3 | 1.4 | 1.5 | 1.6 | 1.7 | 1.8 | 1.9 | 2.0 | 2.1 | 2.2 | 2.3 | 2.4 | 2.5 |
| 1.0 | 133 | 136 | 139 | 143 | 146 | 149 | 153 | 157 | 161 | 165 | 169 | 173 | 178 | 182 | 187 | 192 |
| 1.1 | 135 | 138 | 141 | 144 | 148 | 151 | 155 | 159 | 163 | 167 | 171 | 175 | 180 | 184 | 189 | 194 |
| 1.2 | 137 | 140 | 143 | 146 | 150 | 153 | 157 | 161 | 165 | 169 | 173 | 177 | 182 | 186 | 191 | 196 |
| 1.3 | 139 | 142 | 145 | 148 | 152 | 155 | 159 | 163 | 166 | 171 | 175 | 179 | 183 | 188 | 193 | 197 |
| 1.4 | 141 | 144 | 147 | 150 | 153 | 157 | 161 | 165 | 168 | 172 | 177 | 181 | 185 | 190 | 195 | 199 |
| 1.5 | 143 | 146 | 149 | 152 | 155 | 159 | 163 | 167 | 170 | 175 | 179 | 183 | 187 | 192 | 197 | 201 |
| 1.6 | 145 | 148 | 151 | 154 | 158 | 161 | 165 | 169 | 173 | 177 | 181 | 185 | 189 | 194 | 199 | 203 |
| 1.7 | 147 | 150 | 153 | 156 | 160 | 163 | 167 | 171 | 175 | 179 | 183 | 187 | 192 | 196 | 201 | 206 |
| 1.8 | 149 | 152 | 155 | 158 | 162 | 165 | 168 | 173 | 177 | 181 | 185 | 189 | 194 | 198 | 203 | 208 |
| 1.9 | 151 | 154 | 157 | 161 | 164 | 168 | 171 | 175 | 179 | 183 | 187 | 192 | 196 | 201 | 205 | 210 |
| 2.0 | 153 | 157 | 160 | 163 | 166 | 170 | 174 | 177 | 181 | 185 | 190 | 194 | 198 | 203 | 208 | 212 |
| 2.1 | 156 | 159 | 162 | 165 | 169 | 172 | 176 | 180 | 184 | 188 | 192 | 196 | 201 | 205 | 210 | 215 |
| 2.2 | 158 | 161 | 164 | 168 | 171 | 175 | 178 | 182 | 186 | 190 | 194 | 199 | 203 | 208 | 212 | 217 |
| 2.3 | 161 | 164 | 167 | 170 | 174 | 177 | 181 | 185 | 189 | 193 | 197 | 201 | 206 | 210 | 215 | 220 |
| 2.4 | 163 | 166 | 169 | 173 | 176 | 180 | 183 | 187 | 191 | 195 | 199 | 204 | 208 | 213 | 217 | 222 |
| 2.5 | 166 | 169 | 172 | 175 | 179 | 182 | 186 | 190 | 194 | 198 | 202 | 206 | 211 | 215 | 220 | 225 |
| 2.6 | 168 | 171 | 174 | 178 | 181 | 185 | 189 | 192 | 196 | 200 | 205 | 209 | 213 | 218 | 222 | 227 |
| 2.7 | 171 | 174 | 177 | 181 | 184 | 188 | 191 | 195 | 199 | 203 | 207 | 212 | 216 | 220 | 225 | 230 |
| 2.8 | 174 | 177 | 180 | 183 | 187 | 190 | 194 | 198 | 202 | 206 | 210 | 214 | 219 | 223 | 228 | 233 |

SSE Frequency

MAX All Core Turbo SSE → 3.0 GHz

MAX AVX3/5G-ISA ← 2.8 GHz

BASE TDP Freq SSE → 2.6 GHz

BASE AVX3/5G-ISA ← 2.5 GHz 16C of 32C ... 16C of 32C

*Fig. 5*

FREQUENCY SCALING FOR PER-CORE ACCELERATOR ASSIGNMENTS

CROSS-REFERENCE TO RELATED APPLICATION

This application is a continuation of and claims the benefit of priority to previously filed U.S. patent application Ser. No. 16/933,369, filed Jul. 20, 2020 which in turn claims the benefit of and priority to U.S. Provisional Application No. 63/015,083, filed Apr. 24, 2020. The entire contents of these applications are incorporated herein by reference in their entirety.

BACKGROUND INFORMATION

In 2011 Intel® Corporation introduced its first processor with Advanced Vector Extensions (AVX), which are extensions to the x86 instruction set architecture (ISA). Subsequently, Intel has expanded its AVX offerings to AVX2 and AVX-512. Processors with AVX3-512 are soon to be released. AVX instructions are Single Instruction on Multiple pieces of Data (SIMD) instructions. Prior to AVX, Intel® added Streaming SIMD Extensions (SSE) to the x86 ISA (as well as SSE2, SSE3, SSSE3 and SSE4 instructions). For simplicity each of SSE, each of SSE, SSE2, SSE3, SSSE3 and SSE4 may be referred to as SSE or SSE instructions herein. Similarly, each of AVX, AVX2, AVX-512, AVX3-512 and AVX/5G-ISA may be referred to generally as AVX instructions herein.

AVX instructions support advanced vector-based operations using multiple operands (e.g., 4 operands for AVX-512). AVX instructions are tailored for certain types of mathematical operations, such floating point-intensive calculations in multimedia, scientific, financial applications, and more recently for signal processing. Specifically, AVX-512 capabilities can help with scramble/descramble and modulation as well as symbol-based data processing required for design of Radio Access Network (bare metal, virtualize, Cloud Native). 5G-ISA extensions also can also provide significant boast for symbol-based data processing part of L1 PHY (Physical Layer 1) pipeline (e.g. channel estimation, MIMO equalization, beamforming, precoding). They also increase parallelism and throughput in floating point and integer SIMD calculations. AVX instructions are designed to accelerate workload performance and thus may be referred to as acceleration instructions and/or acceleration capabilities.

While AVX adds acceleration capabilities, they come with a cost in terms of processor power and frequency. AVX instructions require a large number of gates and consume more power than SSE instructions (and x86 instructions). To accommodate this increase in power, CPU cores are operated at lower frequencies when configured to support AVX instructions to keep the processor operating within thermal design power (TDP) specifications.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

FIG. 2 is a table depicting combinations of SSE and AVX3 frequencies and corresponding power consumption levels for an exemplary 32-core CPU having a split of 8 SSE cores and 24 AVX3 cores with a TDP of 185 W;

FIG. 3 is a diagram including a table depicting combinations of SSE and AVX3 frequencies and corresponding power consumption levels for an exemplary 32-core CPU having a split of 16 SSE cores and 16 AVX3 cores with a TDP of 185 W;

FIG. 4 is a diagram including a table depicting combinations of SSE and AVX3 frequencies and corresponding power consumption levels for an exemplary 32-core CPU having a split of 8 SSE cores and 24 AVX3 cores with a TDP of 225 W;

FIG. 5 is a diagram including a table depicting combinations of SSE and AVX3 frequencies and corresponding power consumption levels for an exemplary 32-core CPU having a split of 16 SSE cores and 16 AVX3 cores with a TDP of 225 W;

DETAILED DESCRIPTION

Figure 1:
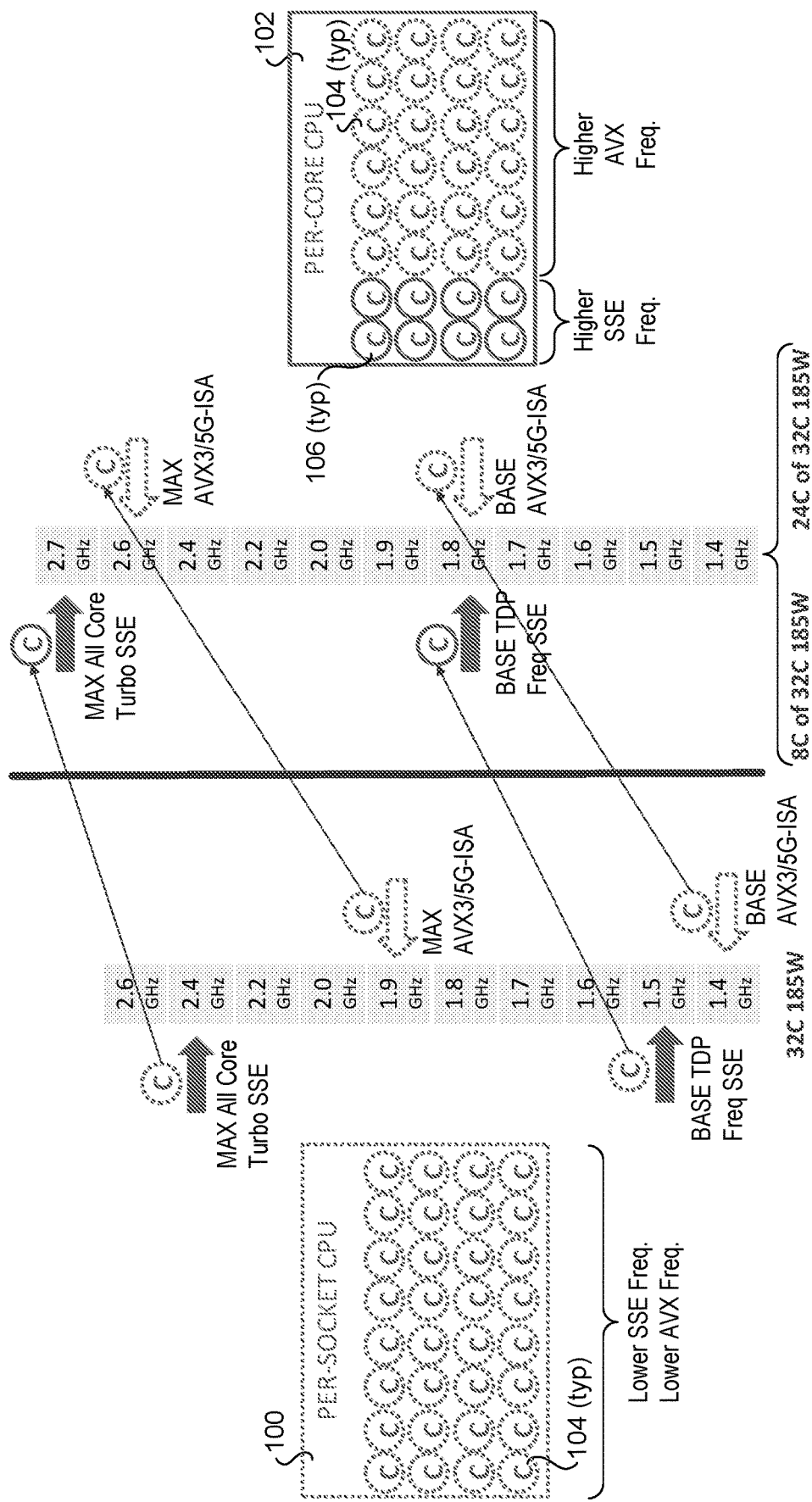
FIG. 1 is a diagram illustrating frequency and performance enhancements provided by a CPU that supports per-core frequency scaling and accelerator assignment as compared to a conventional CPU that supports per-socket frequency scaling and accelerator assignment.

Embodiments of methods for frequency scaling for per-core accelerator assignments and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Under today's CPU architecture, when a core sees an AVX instruction of a certain type (e.g., an AVX2/512 instruction), the core informs a central Power Control Unit (PCU) and waits for a response as these instructions require more current/power to execute. The response that comes back from the PCU informs the requesting core at what frequency it needs to run. This is called license granting and is done to keep total current draw and power consumption in check and avoid damage to the CPU. The core frequency is then switched to execute the AVX instruction.

Subsequently, when the core detects regular instructions (e.g., SSE or "light" AVX2 instructions), it informs the PCU and switches back to normal mode of operation, also referred to herein as the SSE mode. Whenever a core is switching from a lower power to a higher power license mode (e.g., SSE to AVX512), there is a wait time during which no instructions are executed by the requesting core. This wait time is to allow for voltage and current to ramp up.

For examples, latencies can occur during frequency scaling transitions for some accelerator instructions such as AVX3 instructions for processing computational intense L1 (Layer 1) baseband processing for 5G applications such as FlexRAN (Radio Access Network) (referred to herein as AVX3/5G-ISA instructions, which include AVX3, AVX/5G-ISA, and AVX512 instructions). Latencies as high as several hundred microseconds can occur during frequency scaling transitions between processing AVX3/5G-ISA and non-AVX3/5G-ISA instructions.

Certain workloads like FlexRAN are susceptible to this wait time given strict time budgets to process incoming/outgoing data. As a result, FlexRAN-like workloads tend to put either the CPU or entire system in a fixed license mode to avoid jitter caused by wait times when switching between license modes. While this avoids jitter related issues, performance suffers due to lower frequency, as all cores are stuck in a fixed license irrespective of the type of instructions they are executing.

In accordance with aspects of the embodiments disclosed herein, a solution is provided to alleviate this problem by enabling pre-granting of license modes on a per-core basis instead of at the CPU or system level. This allows users to keep cores that execute time sensitive code in a pre-granted license mode without impacting other cores in the system, supporting higher overall performance. Moreover, the cores may be dynamically (re)configured during runtime on a per-core basis, and the frequency of cores may also be dynamically adjusted on a per core basis.

In some embodiments cores may be autonomously configured in response to detection of extended instructions (e.g., AVX3, AVX/5G-ISA, and AVX512 instructions) with substantially no latency and jitter. The ability to support per core licensing increases CPU performance since cores can change licensing mode on an as-needed basis and thus frequency scaling and power can be dynamically adjusted based on the requirements of individual applications and/or threads executing on the CPU cores.

In some embodiments herein, some cores are depicted as operating in an AVX3/5G-ISA license mode. These AVX3 instructions support HFNI (half-float new instructions). HFNI, also referred to as FP16 (16-bit floating point) architecture, provides separate denormal controls for FP16 operations that facilitate using the full dynamic range of the FP16 numbers. It is expected that denormal operations on FP16 will operate at near full speed.

A comparison between the core frequency operation for a current CPU 100 supporting per-socket frequency scaling for accelerator assignments and a CPU 102 supporting per-core frequency scaling for accelerator assignments is shown in FIG. 1. CPU 100 includes 32 cores 104 that are operating in a license mode supporting AVX instructions. To meet the CPU TDP specification (in this example 185 (W)atts), all cores 104 are operated at a frequency of 1.4 GHz. Under a maximum performance "turbo mode," all cores 104 may operate a 1.9 GHz. By comparison, if all cores were operated in the lower-power SSE license mode, the based TDP frequency would be 1.5 GHz and the max turbo mode would be 2.4 GHz.

Under the per-core frequency scaling for accelerator assignment provided by CPU 102, eight cores 106 are configured to operate in SSE mode, while 24 cores 104 are configured to operate in license mode supporting AVX instructions (in this example including AVX3/5G-ISA instructions). For TDP, the processor power specification is 185 W, the same as for CPU 100.

Under an aspect of CPU 102, the cores are configured with one or more separate Fused Multiply Add (FMA) units that are used for selected AVX instructions (including AVX3/5G-ISA instructions). The FMA unit is also referred to as an ISA extension unit since it supports a set of one or more instructions that comprise an extension to the set of ISA instructions provided in a core's main logic circuitry. The power states of the FMA unit may be controlled separately from the cores such that an FMA unit may be selectively placed in a low power or idle power state under which the FMA unit consumes substantially no power. Accordingly, for cores 106 the FMA unit is idled (or effectively disabled), enabling cores 106 to support x86 and SSE instructions. Under some embodiments, the "main" core circuitry may also support some AVX instructions that require lower power than other higher-power AVX instructions implemented in the FMA unit; these AVX instructions are called "light" AVX-light instructions.

Returning to the 185 W TDP specification, this is a power budget for the cumulative power consumed by all the CPU cores for the processor. Since the FMA units for cores 106 are idled or disabled, the power consumed by cores 106 at a given frequency is lower than for cores 104. This enables the frequencies of both cores 106 and 104 for CPU 102 to be increased while staying within the 185 W power budget. As discussed and illustrated in further detail below, different combinations of frequencies may be applied to cores 106 and 104 and be at or below the TDP level or, when operating under turbo mode, the maximum power level. For illustrative purposes, FIG. 1 shows base TDP frequencies of 1.8 GHz for both cores 106 and 104, and respective turbo mode frequencies of 2.7 GHz for cores 106 and 2.6 GHz for cores 104.

FIG. 2 shows a core frequency table 200 for the 32 core (8 SSE/24 AVX) configuration of CPU 102 at a TDP of 185 W, with SSE frequencies on the Y-axis and AVX3 (short for AVX3/5G-ISA) frequencies on the X-axis. Each SSE/AVX3 frequency combination with a white background results in a power consumption level of 185 W or less, while SSE/AVX3 frequency combinations with a gray background exceed 185 W (and thus would not meet the 185 W TDP limit). As illustrated by the table entries that are encircled, there are multiple combination of SSE/AVX3 frequencies that are at or close to the 185 W TDP limit.

FIG. 3 shows a core frequency table 300 for a 32 core 16 SSE/16 AVX configuration for a CPU at a TDP of 185 W. In the 184 W highlighted example shown in bold outline, the base TDP SSE frequency is 2.1 GHz and the base AVX3/5G-ISA frequency of 1.8 GHz. Under the turbo mode the maximum SSE frequency is 2.7 GHz and the maximum AVX3/5G-ISA frequency is 2.3 GHz. As before, different combinations of frequencies for the SSE cores and the AVX cores may be used to meet the TDP power budget of 185 W and higher power levels for the turbo mode.

FIG. 4 shows a core frequency table 400 for a 32 core 8 SSE/24 AVX configuration for a CPU at a TDP of 225 W. In the 225 W highlighted example shown in bold outline, the base TDP SSE frequency is 2.5 GHz and the base AVX3/5G-ISA frequency is 2.3 GHz. Under the turbo mode the maximum SSE frequency is 3.0 GHz and the maximum AVX3/5G-ISA frequency is 2.6 GHz. Different combinations of frequencies for the SSE cores and the AVX cores may be used to meet the TDP power budget of 225 W and higher power levels for the turbo mode.

FIG. 5 shows a core frequency table 500 for a 32 core 16 SSE/16 AVX configuration for a CPU at a TDP of 225 W. In the 225 W highlighted example shown in bold outline, the base TDP SSE frequency is 2.5 GHz and the base AVX3/5G-ISA frequency is 2.5 GHz. Under the turbo mode the maximum SSE frequency is 3.0 GHz and the maximum AVX3/5G-ISA frequency is 2.8 GHz. Different combinations of frequencies for the SSE cores and the AVX cores may be used to meet the TDP power budget of 225 W and higher power levels for the turbo mode.

Figure 6A:
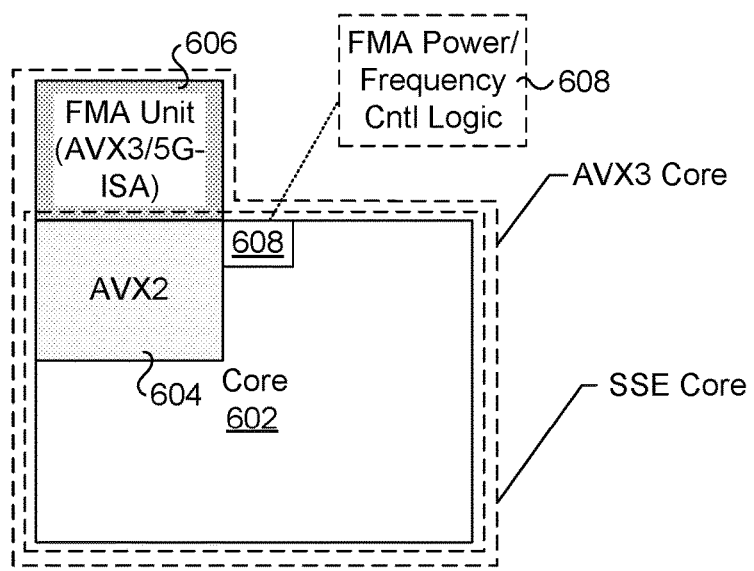
FIG. 6a is a diagram of a processor core including a Fused Multiply Add (FMA) unit supporting AVX3 instructions that can be selectively enabled and disabled, according to one embodiment.

FIG. 6a illustrates a processor core 600 configured to be selectively operated as an SSE core or an AVX core, according to one embodiment including a single FMA unit. Processor core 600 includes core logic 602, an AVX2 logic block 604, an FMA unit 606, and an FMA power and frequency control logic block 608. Core logic 602 includes circuitry for implementing core ISA instructions, such as x86 instructions and SSE instructions in one embodiment. AVX2 logic block 604 includes circuitry to implement AVX2 and (optionally) AVX instructions. FMA unit 606 includes circuitry for implementing AVX3 instructions (e.g., AVX3/5G-ISA instructions). FMA power and frequency control logic block 608 is used to selectively control the frequency of processor core 600 and selectively control whether FMA unit 606 is enabled or disabled (by controlling the power state of the FMA unit).

Figure 6B:
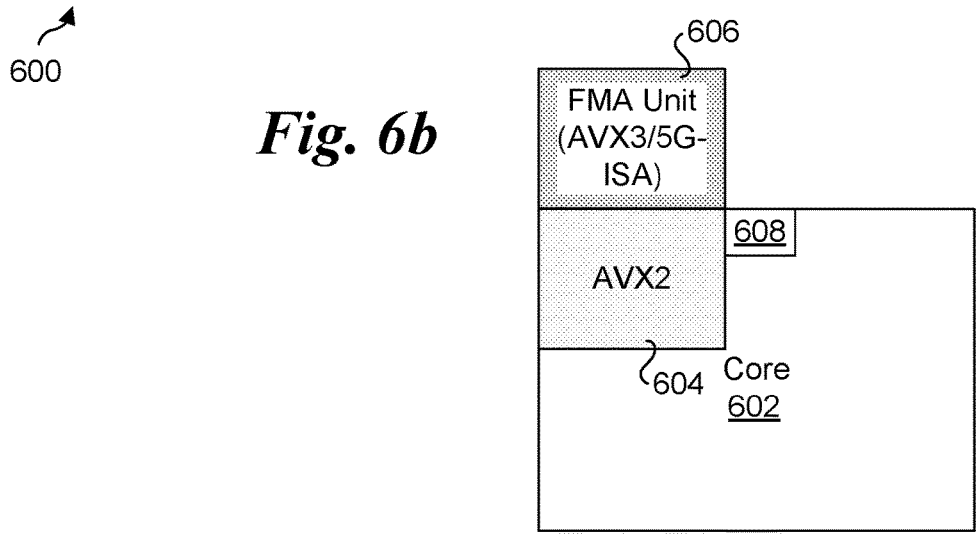
FIG. 6b is a diagram depicting the processor core of FIG. 6a with the FMA unit enabled, corresponding to an AVX license mode.
Figure 6C:
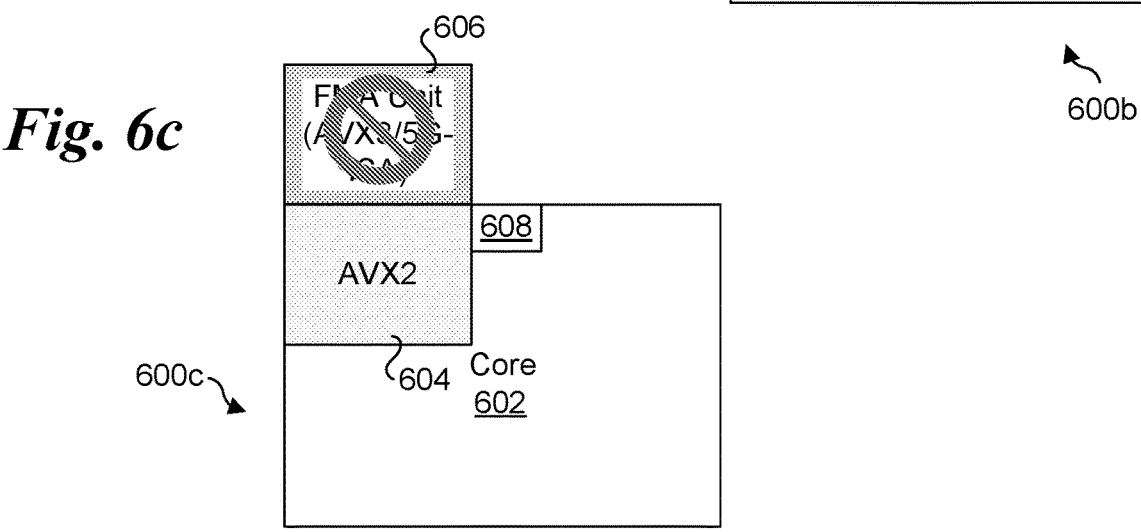
FIG. 6c is a diagram depicting the processor core of FIG. 6a with the FMA unit disabled, corresponding to an SSE license mode.

FIG. 6b shows a processor core 600b configured to support AVX3/5G-ISA instructions. This configuration may be implemented by having FMA power and frequency control logic block 608 activate FMA unit 606. FIG. 6c shows a processor core 600c configured to operate as an SSE core that has FMA unit 606 disabled (i.e., put in a low or idle power state). As discussed above, processor core 600c (an SSE core) consumes less power than processor core 600b (an AVX3 core) when both cores are operated at the same frequency. Generally, a given processor core can be preconfigured in the SSE and AVX3 core configurations during processor boot, as well as being dynamically reconfigured during ongoing runtime processor operations.

Figure 7A:
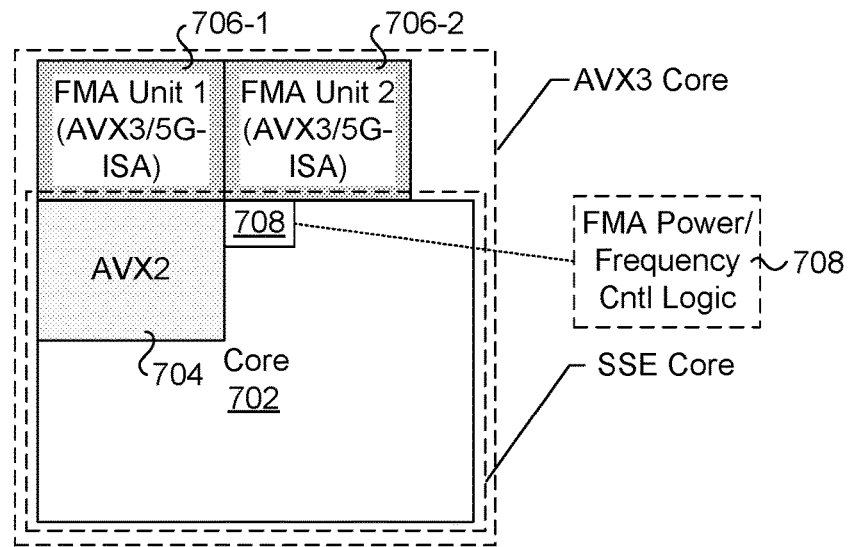
FIG. 7a is a diagram of a processor core including two FMA units supporting AVX3 instructions that can be selectively enabled and disabled, according to one embodiment.

FIG. 7a illustrates a processor core 700 configured to be selectively operated as an SSE core or an AVX core, according to one embodiment including two FMA units. Processor core 700 includes core logic 702, an AVX2 logic block 704, FMA unit 706-1 and 706-2, and an FMA power and frequency control logic block 708. Core logic 702 includes circuitry for implementing core ISA instructions, such as x86 instructions and SSE instructions in one embodiment. AVX2 logic block 704 includes circuitry to implement AVX2 and (optionally) AVX instructions. FMA units 706-1 and 706-2 include circuitry for implementing AVX3 instructions (e.g., AVX3/5G-ISA and AVX512 instructions). FMA power and frequency control logic block 708 is used to selectively control the frequency of processor core 700 and selectively control whether FMA units 706-1 and 706-2 are enabled or disabled (by controlling the power state of the FMA units).

Figure 7B:
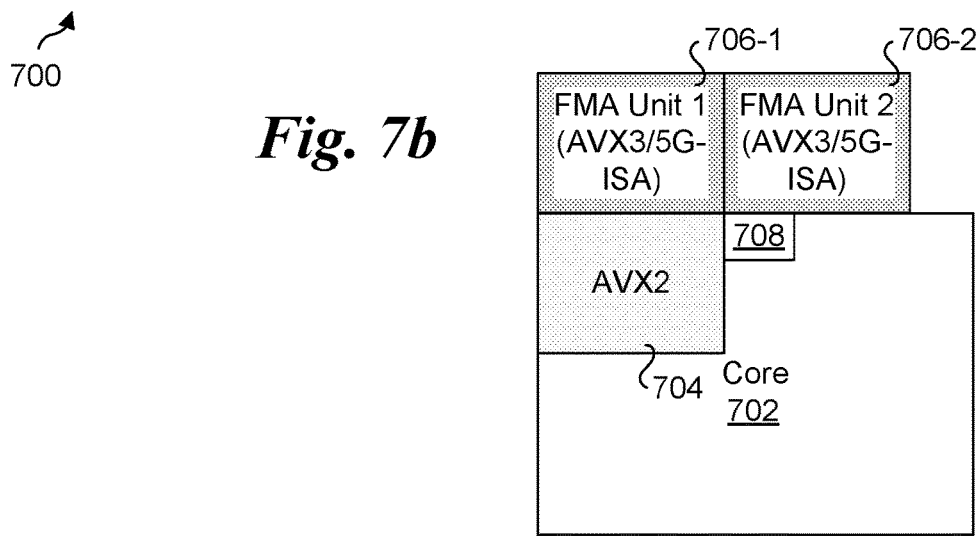
FIG. 7b is a diagram depicting the processor core of FIG. 7a with the FMA units enabled, corresponding to an AVX license mode.
Figure 7C:
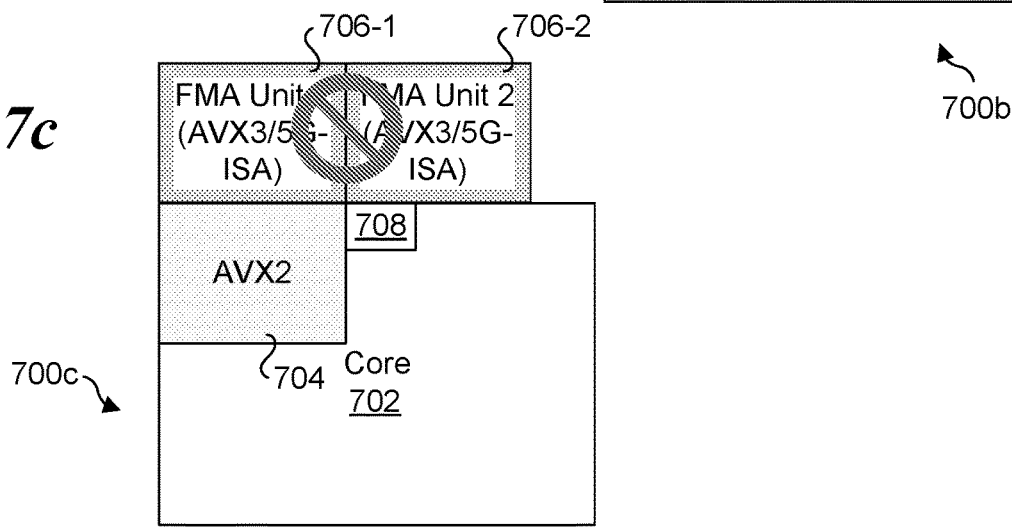
FIG. 7c is a diagram depicting the processor core of FIG. 7a with the FMA units disabled, corresponding to an SSE license mode.

FIG. 7b shows a processor core 700b configured to support AVX3/5G-ISA instructions. This configuration may be implemented by having FMA power and frequency control logic block 708 activate FMA units 706-1 and 706-2. FIG. 7c shows a processor core 700c configured to operate as an SSE core that has FMA units 706-1 and 706-2 disabled (i.e., put in a low or idle power state). As before, processor core 700c (an SSE core) consumes less power than processor core 700b (an AVX3 core) when both cores are operated at the same frequency. Generally, a given processor core can be preconfigured in the SSE and AVX3 core configurations during processor boot, as well as being dynamically reconfigured during ongoing runtime processor operations.

Autonomous Configuration

Figure 8:
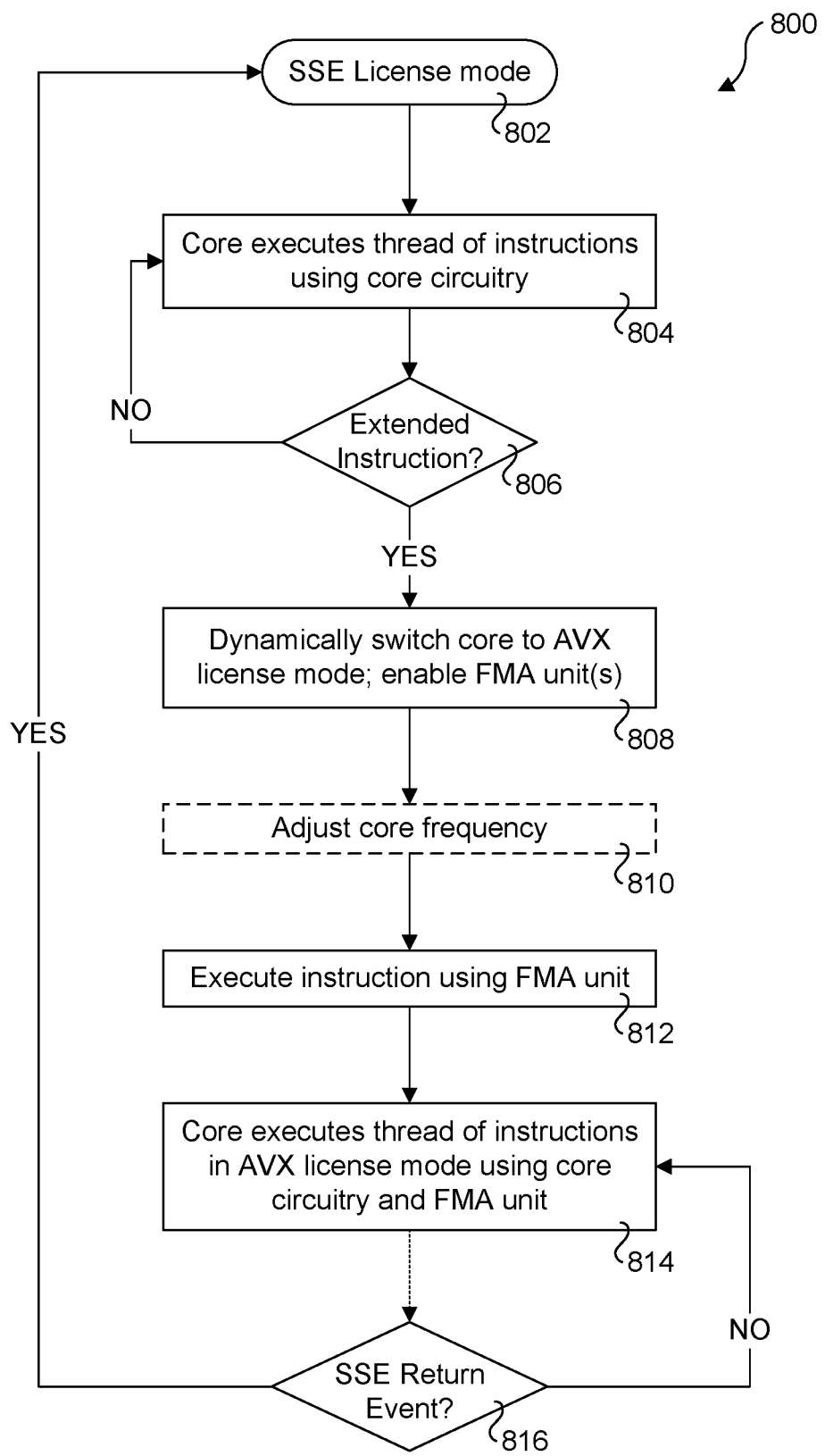
FIG. 8 is a flowchart illustrating operations and logic implemented by cores supporting autonomous configuration, according to one embodiment.

In some embodiments all or a portion of the cores may be autonomously configured to enable and disable one or more FMA units. Operations and logic implemented by one embodiment are shown in a flowchart 800 in FIG. 8. The process begins in a start back 802 in which a core is configured and executing in SSE license mode. The core executes a thread of instructions using it core circuitry, as depicted in a block 804. In conjunction with execution of instructions in the instruction thread, extended instructions may be encountered, as depicted by a decision block 806. An extended instruction is any instruction that is not supported by the ISA in the core block of circuitry, such as an AVX3, AVX5G-ISA, AVX512, or any other instruction that is implemented in an FMA unit or other ISA extension unit.

In response to detection of an extended instruction, the core is dynamically switched to AVX license mode as shown in a block 808. This enables/activates circuitry in one of more FMA units (as applicable). In one embodiment, that latency to activate an FMA unit is on the order of a few microseconds. In an optional block 810, the frequency of the core is adjusted. For example, the core frequency may be adjusted downward. In a block 812 an FMA unit is used to execute the extended instruction. As shown in a block 814 and a decision block 816, the core continues to execute instructions in AVX license mode until an SSE return event occurs (i.e., and event under which the core is to be returned to SSE license mode). For example, in one embodiment a core is returned to SSE license mode if no extended instructions have been executed for a predetermined amount of time.

Cores with Multiple ISA Extension Units with Different Instructions

In some embodiments there are cores with multiple ISA extension units with different instructions. In some embodiments, the multiple ISA extension units including first FMA unit supporting a first set of one or more instructions that operate at a first frequency and a second FMA unit supporting a second set of one or more instructions that operates at a second frequency. In some embodiments the first and second FMA units can be enabled and disabled independently.

Figure 9A:
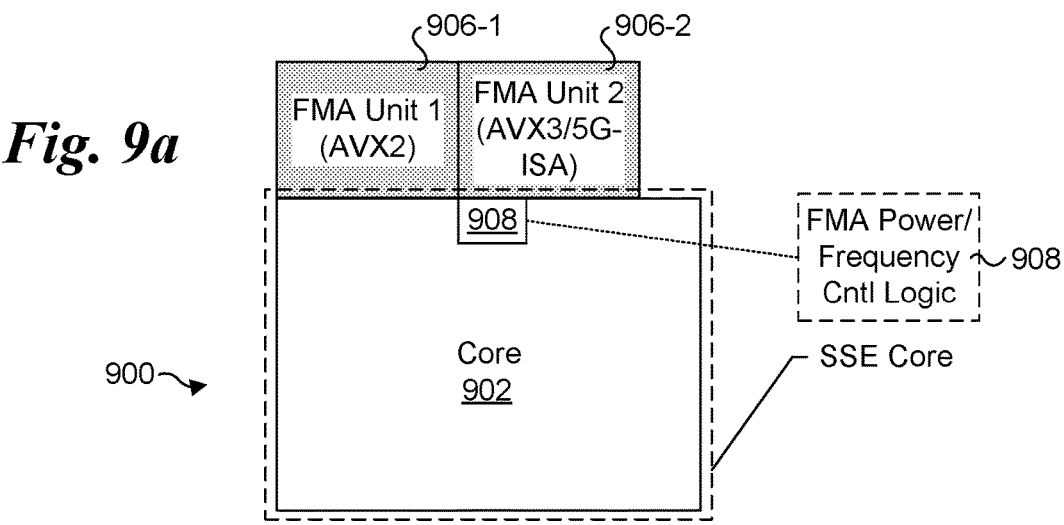
FIG. 9a is a diagram of a processor core including a first FMA unit supporting AVX2 instructions and a second FMA unit supporting AVX3 instructions under which both the first and second FMA units can be selectively enabled and disabled, according to one embodiment.

For example, FIG. 9a illustrates a processor core 900 having two FMA units configured to be selectively operated in three license modes: SSE, AVX2, and AVX3. Processor core 900 includes core logic 902, FMA unit 906-1 and 906-2, and an FMA power and frequency control logic block 908. Core logic 902 includes circuitry for implementing core ISA instructions, such as x86 instructions and SSE instructions in one embodiment. In another embodiment, core logic 902 includes circuitry for also implementing the first generation of AVX instructions. FMA unit 906-1 includes circuitry for implementing AVX2 instructions. FMA unit 906-2 include circuitry for implementing AVX3 instructions (e.g., AVX3/5G-ISA and AVX512 instructions). FMA power and frequency control logic block 908 is used to selectively control the frequency of processor core 900 and selectively control whether FMA units 906-1 and 906-2 are enabled or disabled (by controlling the power state of the FMA units).

Figure 9B:
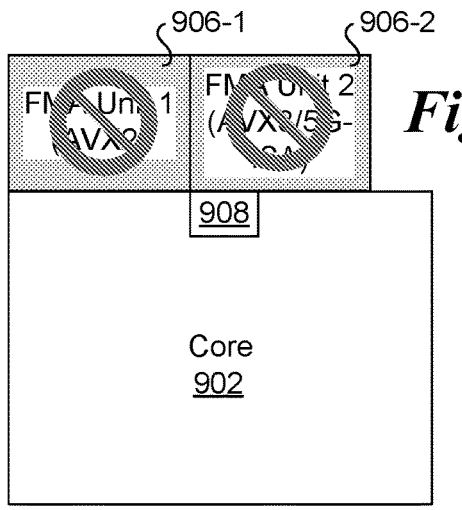
FIG. 9b is a diagram depicting the processor core of FIG. 9a with both the first and second FMA units disabled, corresponding to an SSE license mode.
Figure 9C:
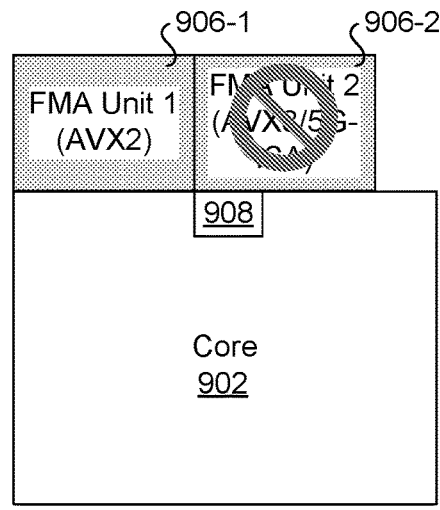
FIG. 9c is a diagram depicting the processor core of FIG. 9a with the first FMA unit enabled and the second FMA unit disabled, corresponding to an AVX2 license mode.
Figure 9D:
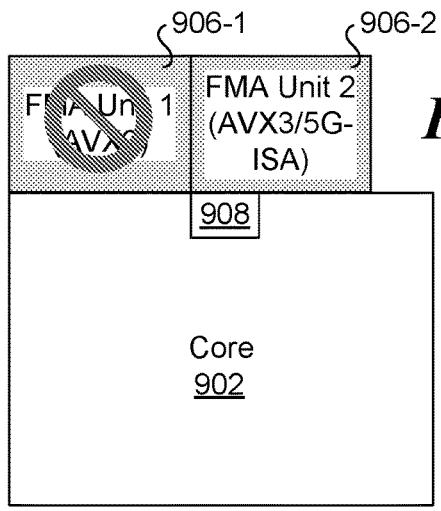
FIG. 9d is a diagram depicting the processor core of FIG. 9a with the first FMA unit disabled and the second FMA unit enabled, corresponding to an AVX3 license mode.
Figure 9E:
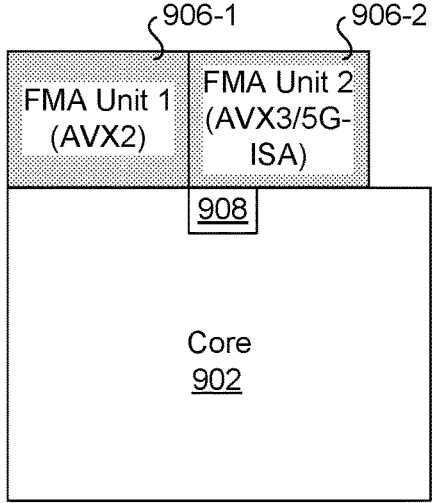
FIG. 9e is a diagram depicting the processor core of FIG. 9a with the both the first and second FMA units enabled, corresponding to an AVX2+AVX3 license mode.

FIG. 9b shows a processor core 900b configured to operate as an SSE core (i.e., in SSE license mode) that has FMA units 906-1 and 906-2 disabled (i.e., put in a low or idle power state). FIG. 9c shows a processor core 900c configured to further support AVX2 instructions and corresponding to an AVX2 license mode. This configuration may be implemented by having FMA power and frequency control logic block 908 activate FMA unit 906-1 while leaving FMA unit 906-2 inactive. FIG. 9d shows a processor core 900d configured to support AVX3/5G-ISA instructions (e.g., AVX3/5G-ISA and AVX512 instructions), corresponding to an AVX3 license mode. This configuration may be implemented by having FMA power and frequency control logic block 908 activate FMA unit 906-2 while leaving FMA unit 906-1 inactive. FIG. 9e shows a processor core 900e with both FMA units 906-1 and 906-2 enabled to support AVX2, AVX3/5G-ISA, and AVX512 instructions and corresponding to an AVX2+AVX3 license mode. This configuration may be implemented by having FMA power and frequency control logic block 908 activate FMA units 906-1 and 906-2. Generally, a given processor core can be preconfigured in any of the configurations shown in FIGS. 9b, 9c, 9d, and 9e during processor boot, as well as being dynamically reconfigured during ongoing runtime processor operations.

Figure 10A:
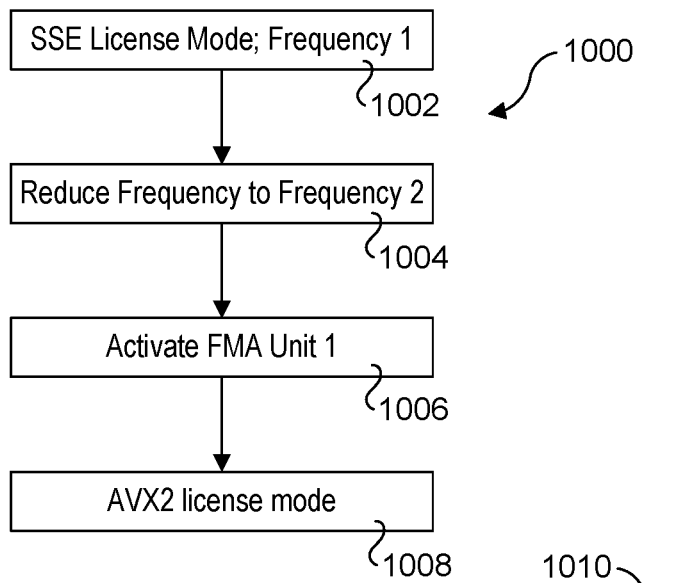
FIG. 10a is a flowchart illustrating operations performed to transition a core from an SSE license mode to an AVX2 license mode, according to one embodiment.
Figure 10B:
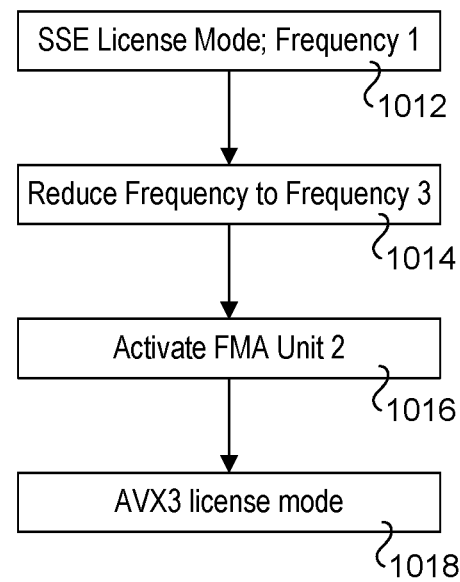
FIG. 10b is a flowchart illustrating operations performed to transition a core from an SSE license mode to an AVX3 license mode, according to one embodiment.
Figure 10C:
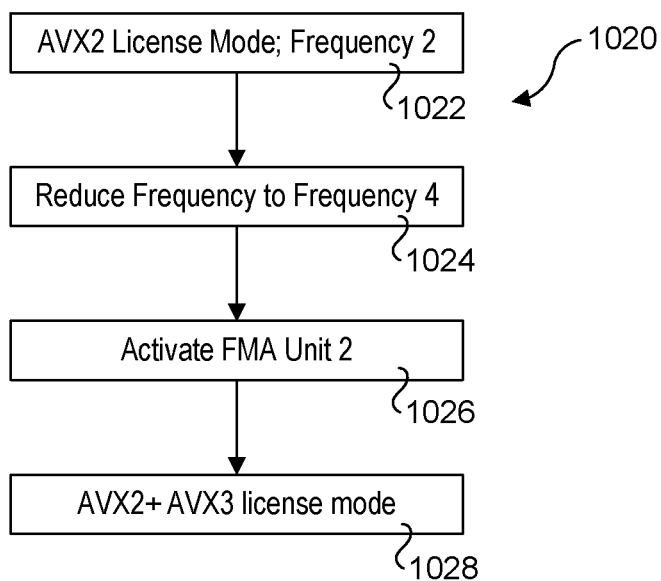
FIG. 10c is a flowchart illustrating operations performed to transition a core from an AVX2 license mode to an AVX3 license mode, according to one embodiment.

FIGS. 10a, 10b, and 10c show flowcharts illustrating operations for transitioning between some license modes. As depicted by a block 1002 in flowchart 1000 of FIG. 10a, the core is initially operating in an SSE license mode at a first frequency 1 corresponding to core 900b in FIG. 9b. To transition to the AVX2 license mode (block 1008) the core frequency is reduced to frequency 2 in block 1004 prior to activating FMA unit 1 in block 1006. This configuration corresponds to core 900c in FIG. 9c.

Flowchart 1010 of FIG. 10b shows a transition from an SSE license mode to an AVX3 license mode. The process begins in a block 1012 with the core operating in SSE license mode (core 900b in FIG. 9b) at frequency 1. In a block 1014, the frequency is reduced from frequency 1 to frequency 3, followed by FMA unit 2 being activated in a block 1016 to obtain the core configuration of 900d shown in FIG. 9d and the AVX3 license mode depicted in block 1018.

Flowchart 1020 of FIG. 10c shows a transition from the AVX2 license mode to an AVX2+AVX3 license mode. The process begins in a block 1022 with the core operating in AVX2 license mode (core 900c in FIG. 9c) at frequency 2. In a block 1024, the frequency is reduced from frequency 2 to frequency 4, followed by FMA unit 2 being activated in a block 1026 to obtain the core configuration of 900e shown in FIG. 9e and as depicted by AVX2+AVX3 license mode in block 1028. Under the core configuration 900e, both FMA unit 1 and unit 2 are activated. Accordingly, to maintain power consumption balance, frequency 4 is less that frequency 3.

Transitioning from an AVX2 license mode to an SSE license mode entails operations that are the reverse of those shown in flowchart 1000 of FIG. 10*a*, except FMA unit 1 is deactivated in block 1006 and the frequency is increased from frequency 2 to frequency 1 in block 1004. Similarly, transitioning from an AVX3 license mode to an SSE license mode entails operations that are the reverse of those shown in flowchart 1010 of FIG. 10*b*, except FMA unit 2 is deactivated in block 1016 and the frequency is increased from frequency 3 to frequency 1 in block 1004. Likewise, transitioning from an AVX2+AVX3 license mode to an AVX2 license mode entails operations that are the reverse of those shown in flowchart 1020 of FIG. 10*c*, except FMA unit 2 is deactivated in block 1026 and the frequency is increased from frequency 4 to frequency 2 in block 1014.

In some embodiments, an FMA unit includes circuitry for implementing Advanced Matrix Extension (AMX) instructions. AMX instructions are targeted for performing matrix operations used for machine learning (ML) algorithms and artificial intelligence (AI) applications. For example, ML algorithms and frameworks used for deep learning employ multiple layers of artificial neurons that are interconnected to form a neural network, commonly referred to as an ANN. ML algorithms for ANNs employ a tremendous level of matrix mathematics, and AMX instructions are designed enhance the performance of such algorithms.

Figure 11:
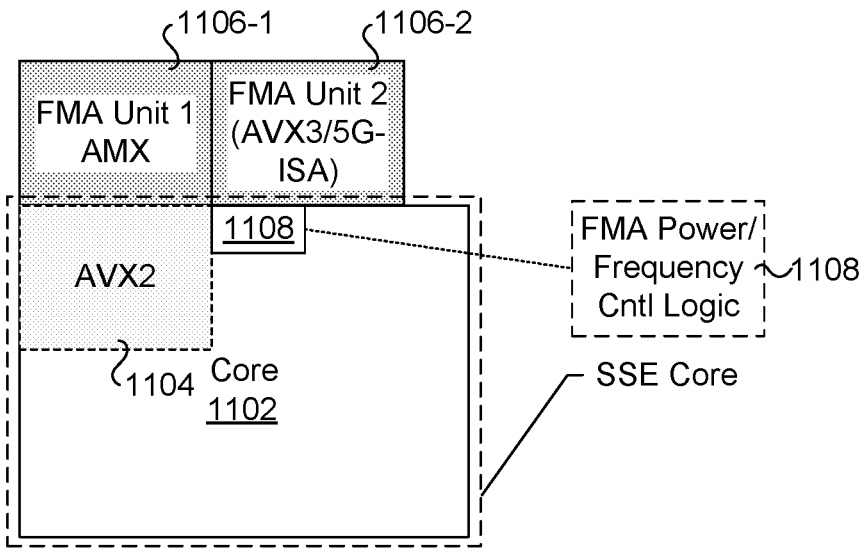
FIG. 11 is a diagram depicted a processor core with a first FMA unit configured to support AMX instructions and a second FMA unit configured to perform AVX3/5G-ISA instructions, according to one embodiment.

For example, FIG. 11 illustrates a processor core 1100 having two FMA units configured to be selectively operated in three license modes: SSE, AMX, and AVX3. Processor core 1100 includes core logic 1102, an optional AVX2 logic block 1104, FMA units 1106-1 and 1106-2, and an FMA power and frequency control logic block 1108. Core logic 1102 includes circuitry for implementing core ISA instructions, such as x86 instructions and SSE instructions in one embodiment. Optional AVX2 logic block 1104 includes circuitry to implement AVX2 and (optionally) AVX instructions. FMA unit 1106-1 includes circuitry for implementing AMX instructions. FMA unit 1106-2 include circuitry for implementing AVX3 instructions (e.g., AVX3/5G-ISA and AVX512 instructions). FMA power and frequency control logic block 1108 is used to selectively control the frequency of processor core 1100 and selectively control whether FMA units 1106-1 and 1106-2 are enabled or disabled (by controlling the power state of the FMA units).

In a manner similar to that described above for processor core 900, FMA units 1106-1 and 1106-2 may be individually enabled (activated) and disabled (deactivated). A processor implementing processor core 1100 may support autonomous per-core configuration, as well as pre-configuration on a per-core basis.

Figure 12:
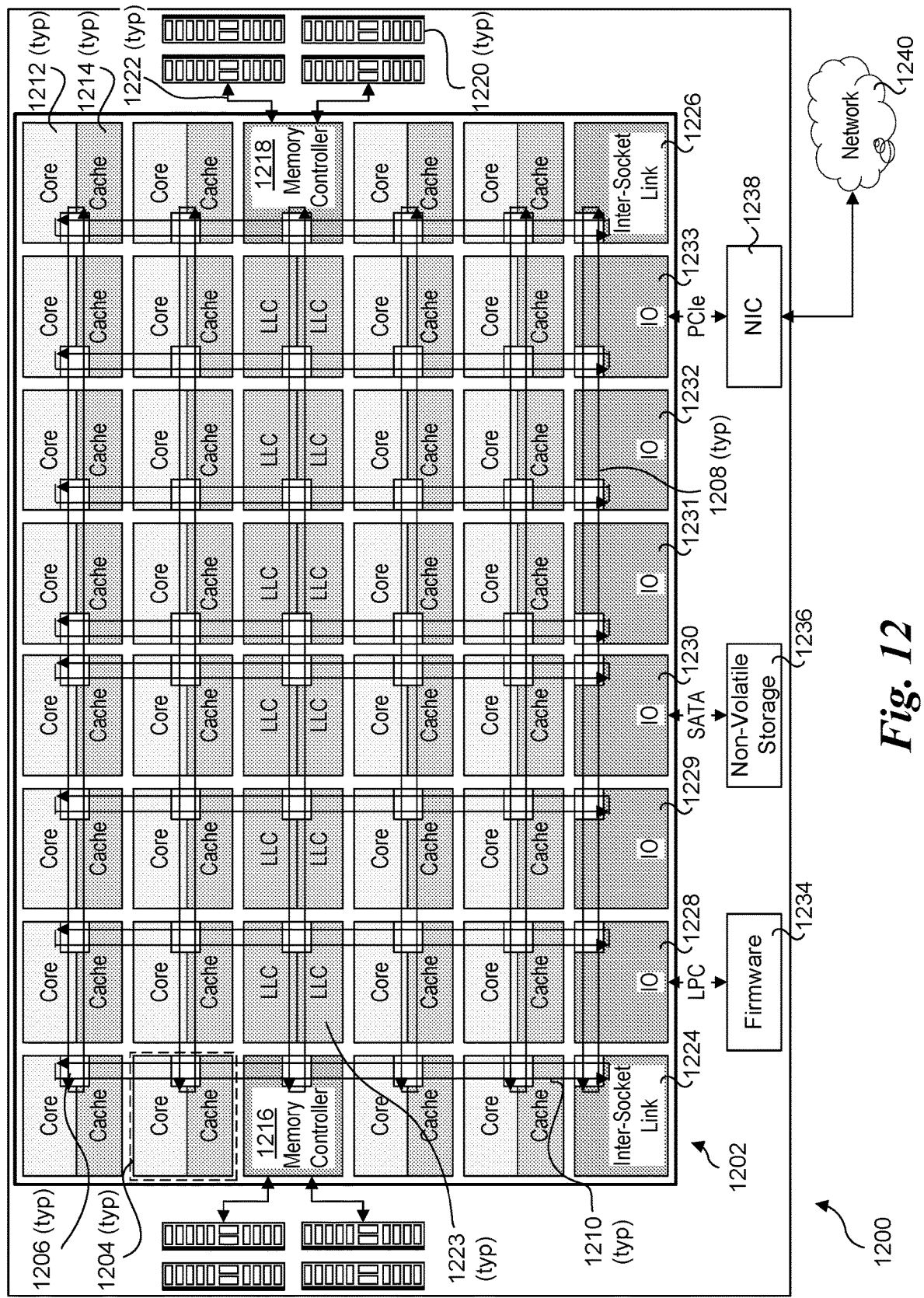
FIG. 12 is a schematic diagram of a computer system including an SoC processor having a plurality of tiles arranged in a two-dimensional array interconnected via mesh interconnect on-die fabric, according to one embodiment.

FIG. 12 shows a server platform 1200 that includes a SoC processor 1202 with a plurality of cores configured to support per-core frequency scaling for accelerator assignment in accordance with aspects of the embodiments discussed above. SoC 1202 includes 48 tiles 1204 arranged in six rows and eight columns. Each tile 1204 includes a respective mesh stop 1206, with the mesh stops interconnected in each row by a ring interconnect 1208 and in each column by a ring interconnect 1210. Generally, ring interconnects 1208 and 1210 may be implemented as unidirectional rings (as shown) or bi-directional rings. Each ring interconnect 1208 and 1210 includes many wires (e.g., upwards of 1000) that are shown as single arrows for simplicity. The ring interconnects wiring is generally implemented in 3D space using multiple layers, and selected mesh stops support "turning" under which the direction of data, signals, and/or messages that are routed using the ring interconnects may change (e.g., from a horizontal direction to vertical direction and vice versa).

Processor SoC 1202 includes 32 cores 1212, each implemented on a respective tile 1204 and co-located with an L1 and L2 cache, as depicted by caches 1214 for simplicity. Processor SoC 1202 further includes a pair of memory controllers 1216 and 1218, each connected to one of more DIMMs (Dual In-line Memory Modules) 1220 via one or more memory channels 1222. Generally, DIMMs may be any current or future type of DIMM such as DDR4 (double data rate, fourth generation) or DDR5. Alternatively, or in addition to, NVDIMMs (Non-volatile DIMMs) may be used, such as but not limited to Intel® 3D-Xpoint® NVDIMMs.

In the illustrated embodiment, memory controllers 1216 and 1218 are in a row including 12 Last Level Caches (LLCs) 1223. The number of LLCs may vary by processor design. Under some architectures, each core is allocated a respective "slice" of an aggregated LLC (a single LLC that is shared amongst the cores). In other embodiments, allocation of the LLCs is more or less granular.

Processor SoC 1202 further includes a pair of inter-socket links 1224 and 1226, and six Input-Output (IO) tiles 1228, 1229, 1230, 1231, 1232, and 1233. Generally, IO tiles are representative of various types of IO components that are implemented on SoCs, such as Peripheral Component Interconnect (PCIe) IO components, storage device IO controller (e.g., SATA, PCIe), high-speed interfaces such as DMI (Direct Media Interface), Low Pin-Count (LPC) interfaces, Serial Peripheral Interface (SPI), etc. Generally, a PCIe IO tile may include a PCIe root complex and one or more PCIe root ports. The IO tiles may also be configured to support an IO hierarchy (such as but not limited to PCIe), in some embodiments.

As further illustrated in FIG. 12, IO tile 1228 is connected to a firmware storage device 1234 via an LPC link, while IO tile 1230 is connected to a non-volatile storage device 1236 such as a Solid-State Drive (SSD), or a magnetic or optical disk via a SATA link. Additionally, IO interface 1233 is connected to a Network Interface Controller (NIC) 1238 via a PCIe link, which provides an interface to an external network 1240.

Inter-socket links 1224 and 1226 are used to provide high-speed serial interfaces with other SoC processors (not shown) when server platform 1200 is a multi-socket platform. In one embodiment, inter-socket links 1224 and 1226 implement Universal Path Interconnect (UPI) interfaces and SoC processor 1202 is connected to one or more other sockets via UPI socket-to-socket interconnects.

It will be understood by those having skill in the processor arts that the configuration of SoC processor 1202 is simplified for illustrative purposes. A SoC processor may include additional components that are not illustrated, such as additional LLC tiles, as well as components relating to power management, and manageability, just to name a few. In addition, the use of 32 cores and 32 core tiles illustrated in the Figures herein is merely exemplary and non-limiting, as the principles and teachings herein may be applied to SoC processors with any number of cores.

Tiles are depicted herein for simplification and illustrative purposes. Generally, a tile is representative of a respective IP (intellectual property) block or a set of related IP blocks or SoC components. For example, a tile may represent a processor core, a combination of a processor core and L1/L2 cache, a memory controller, an IO component, etc. Each of the tiles may also have one or more agents associated with it (not shown).

Each tile includes an associated mesh stop node, also referred to as a mesh stop, which are similar to ring stop nodes for ring interconnects. Some embodiments may include mesh stops (not shown) that are not associated with any particular tile, and may be used to insert additional message slots onto a ring, which enables messages to be inserted at other mesh stops along the ring; these tiles are generally not associated with an IP block or the like (other than logic to insert the message slots). FIG. 12 illustrates an example an SoC Processor showing tiles and their associated mesh stops.

Cores 1212 may be selectively configured as to operate in any of the license modes described and illustrated herein (for simplicity and lack of space, the depiction of cores 1212 is abstracted in FIG. 12). Power management facilities on processor SoC (not separately shown) may be used to provide control signals or commands to the FMA power and frequency control logic block for each core.

Exemplary Application Contexts

Figure 13:
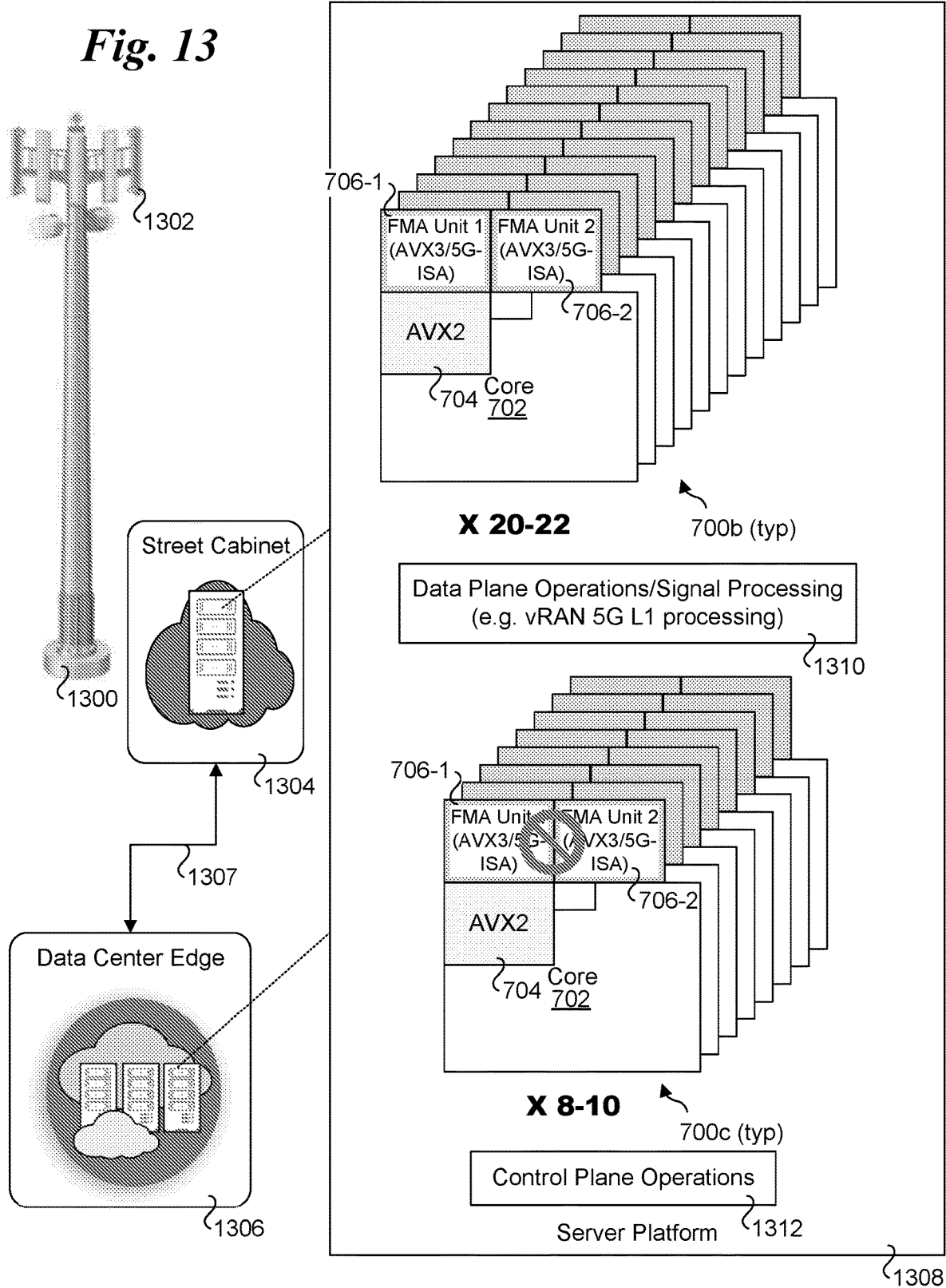
FIG. 13 is a schematic diagram of an exemplary use context under which server platforms employ processors that are configured with to perform data plane and signal processing operations using AVX cores and control plane operations using SSE cores.

FIG. 13 shows an exemplary application context the applies to a telecommunications system including a cell tower 1300 having a plurality of antennas 1302 and having a street cabinet 1304 at its base that is coupled to a data center edge 1306 via a high-bandwidth link 1307. Each one or more server platforms 1308 are installed in street cabinet 1304 and multiple server platforms 1308 are installed in data center edge 1306. Server platform 1308 may be a single socket platform or a dual-socket platform, with each socket (i.e., SoC processor) having 32 cores. Under the illustrated configuration, 20-22 of the 32 cores are configured to operate in the AVX3 license mode (and have configurations 700b with FMA units 706-1 and 706-2 enabled), while 8-10 of the 32 cores are configured as SSE cores (and have configuration 700c with FMA units 706-1 and 706-2 disabled).

In one embodiment server platforms 1308 are running Intel's® FlexRAN software (a type of virtual RAN or vRAN), which provides optimized libraries and L1/L2 pipeline for LTE and for 5G NR Layer 1 (L1) workload acceleration. This set of libraries supports Forward Error Correction (FEC), rate matching, cyclic redundancy check (CRC), channel estimation, MIMO detection, beamforming and other appropriate functions as specified in the 3rd Generation Partnership Project (3GPP) standards. FlexRAN is also designed to be integrated with the Data Plane Development Kit (DPDK) Wireless Baseband device library (BBDEV) virtual Poll Mode Driver (PMD).

DPDK logically divides workload processing into data plane and control plane operations. For FlexRAN, the data plane operations include LTE and 5G L1 (Physical Layer) signal processing. The AVX3/5G-ISA instructions include instructions that are specifically designed to address LTE and 5G L1 signal processing, including the HFNI instructions discussed above. In one embodiment, the workload is split between the data plane and control plane such that 70-75% of the cores are used to support signal processing and/or baseband operations with the remaining 25-30% of the cores being used to support control plane operations. This split is shown in FIG. 13, where the 20-22 AVX cores are used to perform data plane operations and signal processing, as depicted in a block 1310, while the 8-10 SSE cores are used for performing control plane operations.

Figure 14:
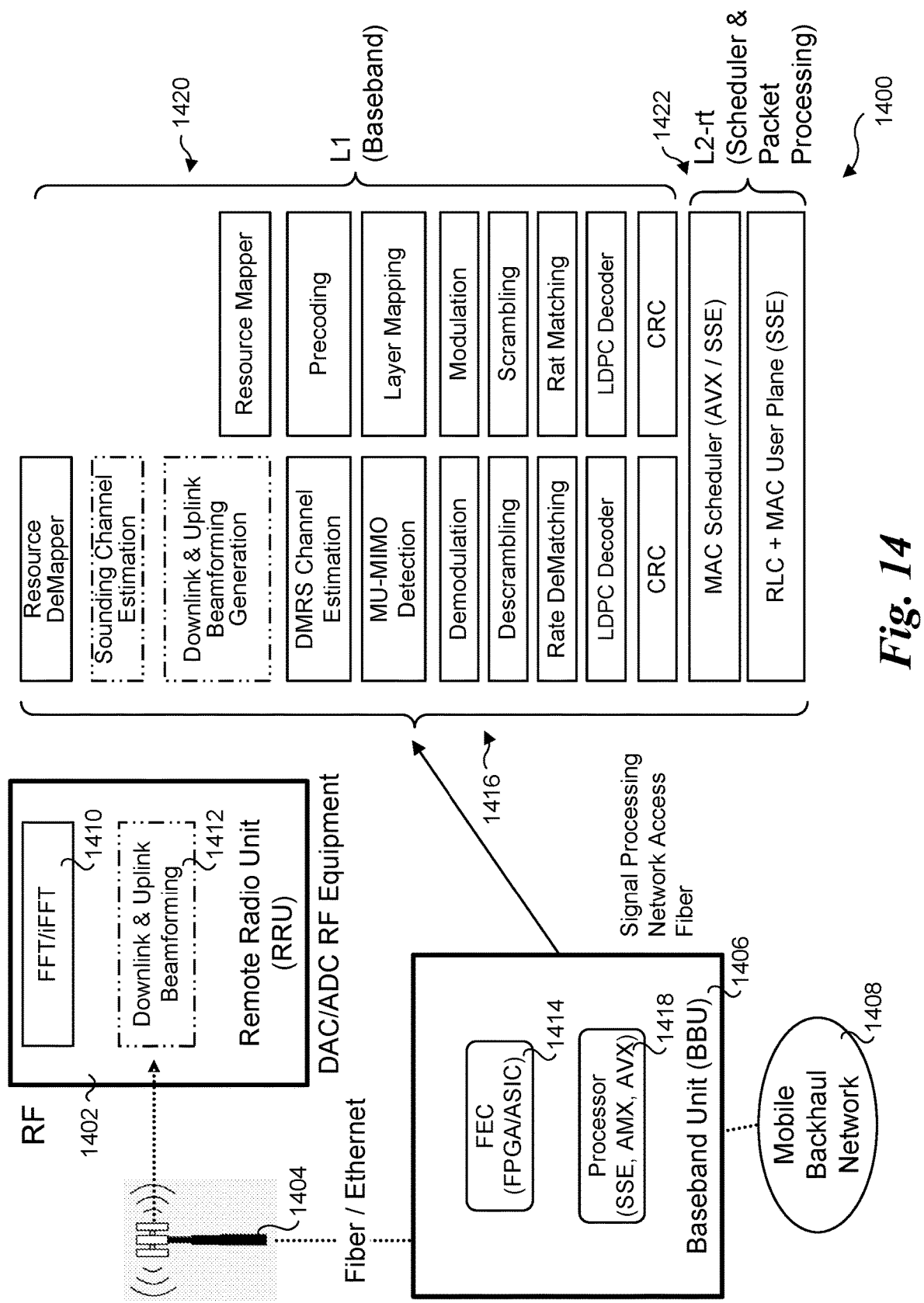
FIG. 14 is a schematic block diagram illustrating an exemplary VRAN employing a processor in a baseband unit (BBU) having a first set of cores configured to perform L1 operations and a second set of cores configured to perform L2-rt operations via execution of corresponding software on those cores.
Figure 15:
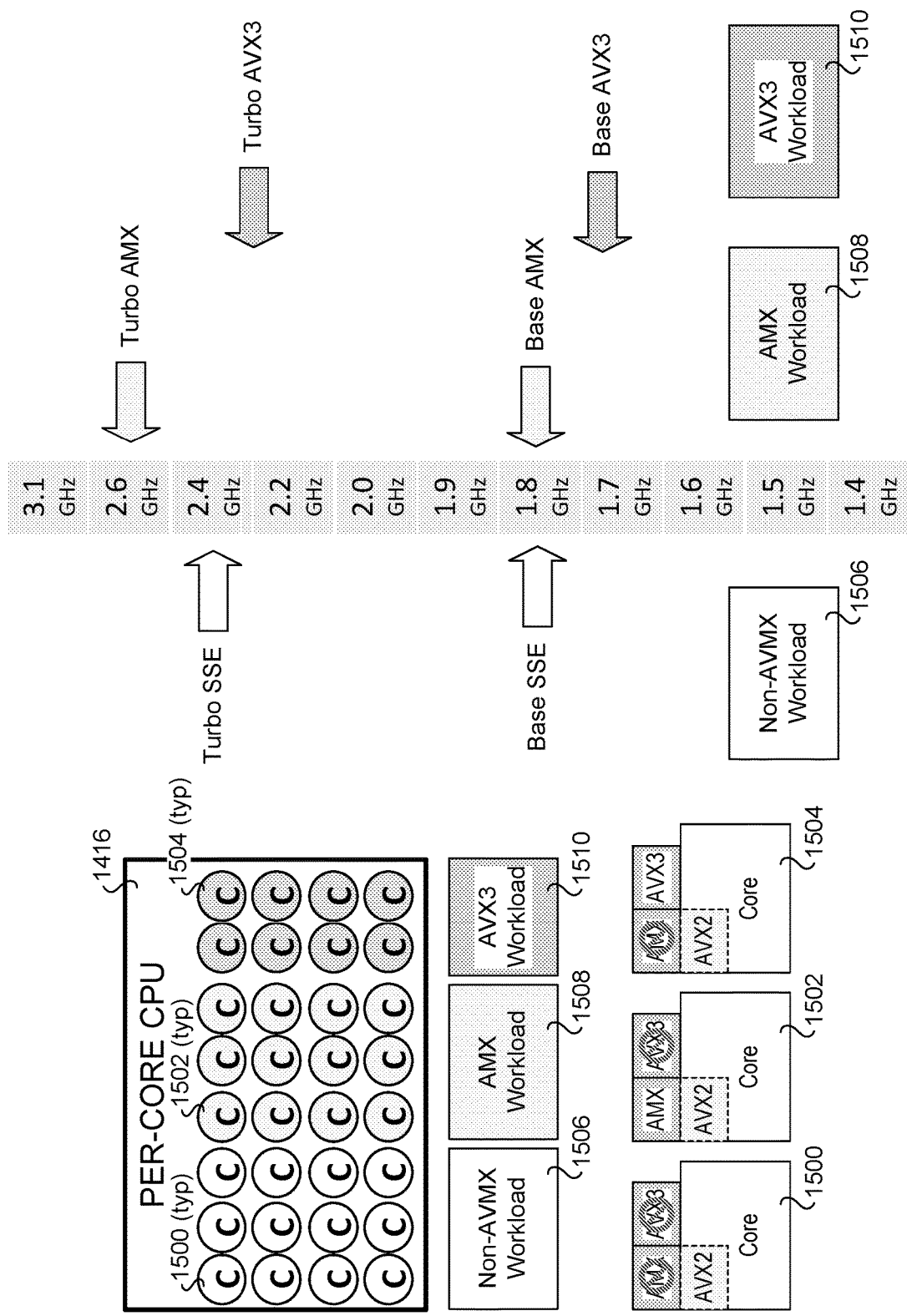
FIG. 15 is a schematic diagram illustrating an example of a processor that have three sets of cores configured for performing a non-AVMX workload, an AMX workload, and an AVX3 workload.

FIGS. 14 and 15 shows further details of a VRAN application context, according to one embodiment. Diagram 1400 in FIG. 14 depicts a remote radio unit (RRU) 1402 implemented in a cell tower 1404 having a baseband unit (BBU) 1406 and coupled to a mobile backhaul network 1408. RRU 1402 includes digital to analog and analog to digital radio frequency (DAC/ADC RF) equipment and is configured to implement Fast Fourier transforms and inverse Fast Fourier transforms in an FFT/iFFT block 1410 and is configured to implement downlink and uplink beamforming 1412. BBU implements hardware-based Forward Error Correction (FEC) using an one or more accelerators implemented as an FPGA or ASIC 1414 and runs a software stack 1416 on a processor 1418. Software stack 1416 is partitioned into an L1 stack 1420 used for baseband processing and an L2-rt (real-time) stack 1422 used for scheduling and packet processing.

FIG. 15 shows further details of processor 1416, according to one configuration. As shown, processor 1416 includes 32 cores with 12 cores 1500 configured in an SSE license mode, 12 cores 1502 configured in an AMX license mode, and 8 cores 1504 configured in an AVX3 license mode. Cores 1502 execute software including AMX instructions to perform an AMX workload 1508. Cores 1504 execute software including AVX3 instructions (e.g., AVX3/5G-ISA instructions) to perform an AVX3 workload, while cores 1500 execute SSE and optionally AVX/AVX2 instruction to perform a non-AVMX workload 1506. Exemplary base and turbo mode frequencies for cores 1500, 1502, and 1504 are also shown in the right side of FIG. 15.

In some embodiments, the cores in the processor of a BBU are pre-configured based on the workload. An advantage of pre-configuration is that it eliminates the possibility of jitter caused by switching between licensing modes; rather selected cores are preconfigured to perform workloads via execution of instructions associated with the workloads. In the context of mobile networking, facilities are used for managing various distributed equipment, such as BBUs. In some environments these facilities include a management and orchestration layer (MANO) comprising one or more servers that run management and orchestration code.

Figure 16:
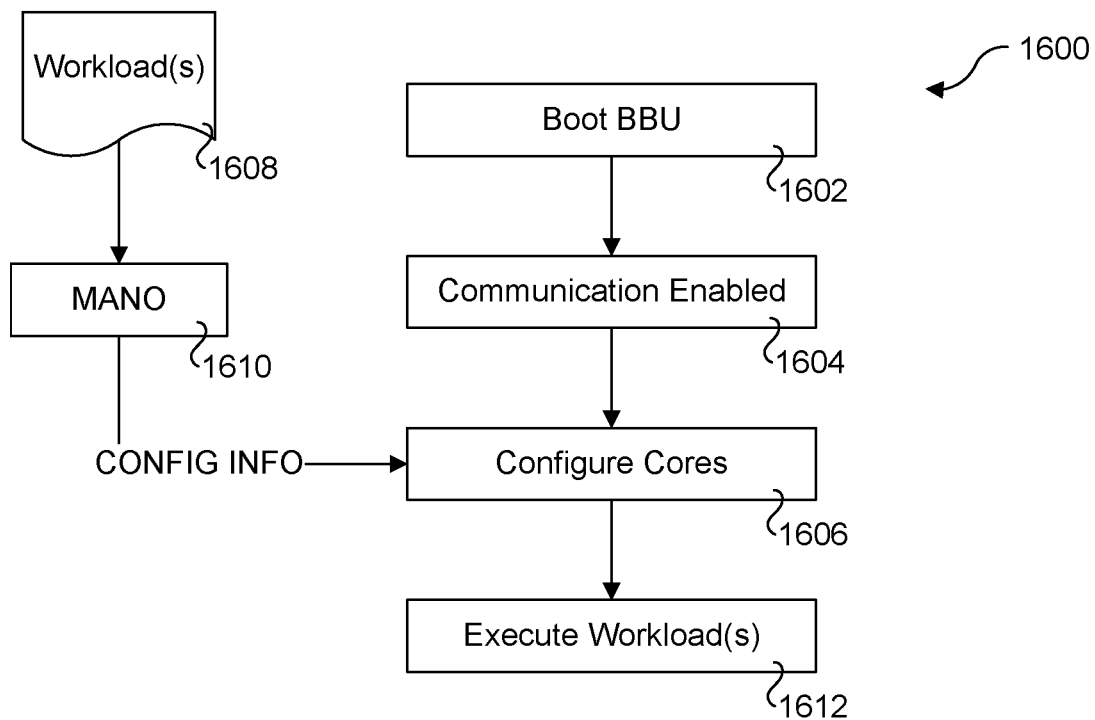
FIG. 16 is a flowchart illustrating a process for preconfiguring cores in a processor in a BBU using a MANO.

FIG. 16 shows a flowchart 1600 illustrating an example of pre-configurating the processor of a BBU in consideration of the workload that is to be handled. The process begins in a block 6012 where the BBU is booted. This includes booting of the system firmware and may also include booting of an operating system on the hardware in some embodiments, while other embodiments that are implemented using bare metal (Type-1) hypervisors or containers will boot up applicable software to support those environments.

In a block 1604 communication is enabled (e.g., communication between the BBU and a management entity). Under some embodiments, the communication will be supported by software components running on the processor, such as a conventional networking stack. In other embodiments, out-of-band (OOB) communication between a management entity such and the BBU may be supported under which the processor cores are configured using an OOB channel.

In a block 1606 the cores are (pre-)configured. As depicted, one or more workloads 1608 are provided to a MANO 1610 that examines the workload(s) and determines how to preconfigure the cores for the BBU processor to best perform them. Workload(s) 1608 is illustrative of one or more identified workloads or otherwise may identify a particular deployment package to be executed on the processor, such as a VRAN package.

After the cores are configured, the workload(s) are executed using the processor cores, as depicted in a block 1612. As an illustrative example, cores 1500, 1502, and 1504 for processor 1416 in FIGS. 14 and 15 are preconfigured in one embodiment.

The processor SoCs and server platforms described and illustrated herein may be used to support other types of workloads using existing and future software applications/libraries. For instance, applications requiring workload acceleration provided by a portion of a processors ISA instructions that are implemented in a separate unit or block of circuitry in a core (that can be selectively enabled and disabled) may be well-suited for implementation with these processor SoCs and server platforms. As used herein, selectively enabled and disabled include cores include one or more ISA extension units that may be one or more of pre-configured prior to runtime and dynamically configured during runtime. Dynamically configured includes having some entity or component on the processor enable and disable cores as well as cores that perform autonomous configuration changes.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A processor, comprising:
a plurality of cores to be selectively configured on a per-core basis to operate in a first mode associated with execution of a particular type of instructions of an instruction set and a second mode not associated with the particular type of instructions; and
power control circuitry to:
receive a request to pre-grant licenses to a number of cores of the plurality of cores to operate in the first mode,
determine a first plurality of frequency values at which the number of cores are to operate,
pre-grant the licenses to the number of cores, and
determine a second plurality of frequency values at which other cores of the plurality of cores are to operate,
wherein the first plurality of frequency values and the second plurality of frequency values are based, at least in part, on a maximum power budget supported by the processor.

2. The processor of claim 1, wherein the first mode is associated with a relatively higher power consumption when executed on a corresponding core and the second mode is associated with a relatively lower power consumption when executed on the corresponding core.

3. The processor of claim 1, wherein the first plurality of frequency values includes a first base frequency value and a first maximum frequency value and the second plurality of frequency values includes a second base frequency value and a second maximum frequency value.

4. The processor of claim 1, wherein the number is based on a plurality of workloads to be executed on the plurality of cores.

5. The processor of claim 4, wherein the plurality of workloads comprise a one or more workloads which include the particular type of instructions and one or more workloads which do not include the particular type of instructions.

6. The processor of claim 5, wherein the one or more workloads which include the particular type of instructions include at least one of: radio access network (RAN) workloads and media workloads.

7. The processor of claim 6, wherein the RAN workloads comprise long-term evolution (LTE) and 5G physical layer signal processing workloads.

8. The processor of claim 1, wherein the particular type of instructions comprises at least one of: AVX-512 instructions and 5G instructions.

9. A method, comprising:
receiving a request to pre-grant licenses to a number of cores of a plurality of cores to operate in a first mode, the first mode associated with execution of a particular type of instructions;
determining a first plurality of frequency values at which the number of cores are to operate;
pre-granting the licenses to the number of cores; and
determining a second plurality of frequency values at which other cores of the plurality of cores are to operate,
wherein the first plurality of frequency values and the second plurality of frequency values are based, at least in part, on a maximum power budget supported by the processor.

10. The method of claim 9, wherein the first mode is associated with a relatively higher power consumption when executed on a corresponding core and the second mode is associated with a relatively lower power consumption when executed on the corresponding core.

11. The method of claim 9, wherein the first plurality of frequency values includes a first base frequency value and a first maximum frequency value and the second plurality of frequency values includes a second base frequency value and a second maximum frequency value.

12. The method of claim 9, wherein the number is based on a plurality of workloads to be executed on the plurality of cores.

13. The method of claim 12, wherein the plurality of workloads comprise a one or more workloads which include the particular type of instructions and one or more workloads which do not include the particular type of instructions.

14. The method of claim 13, wherein the one or more workloads which include the particular type of instructions include at least one of: radio access network (RAN) workloads and media workloads.

15. The method of claim 14, wherein the RAN workloads comprise long-term evolution (LTE) and 5G physical layer signal processing workloads.

16. The method of claim 9, wherein the particular type of instructions comprises at least one of: AVX-512 instructions and 5G instructions.

17. A non-transitory machine-readable medium having program code stored thereon which, when executed by a machine, causes the machine to perform operations, comprising:
receiving a request to pre-grant licenses to a number of cores of a plurality of cores to operate in a first mode, the first mode associated with execution of a particular type of instructions;
determining a first plurality of frequency values at which the number of cores are to operate;
pre-granting the licenses to the number of cores; and
determining a second plurality of frequency values at which other cores of the plurality of cores are to operate,
wherein the first plurality of frequency values and the second plurality of frequency values are based, at least in part, on a maximum power budget supported by the processor.

18. The non-transitory machine-readable medium of claim 17, wherein the first mode is associated with a relatively higher power consumption when executed on a corresponding core and the second mode is associated with a relatively lower power consumption when executed on the corresponding core.

19. The non-transitory machine-readable medium of claim 17, wherein the first plurality of frequency values includes a first base frequency value and a first maximum frequency value and the second plurality of frequency values includes a second base frequency value and a second maximum frequency value.

20. The non-transitory machine-readable medium of claim 17, wherein the number is based on a plurality of workloads to be executed on the plurality of cores.

21. The non-transitory machine-readable medium of claim 20, wherein the plurality of workloads comprise a one or more workloads which include the particular type of instructions and one or more workloads which do not include the particular type of instructions.

22. The non-transitory machine-readable medium of claim 21, wherein the one or more workloads which include the particular type of instructions include at least one of: radio access network (RAN) workloads and media workloads.

23. The non-transitory machine-readable medium of claim 22, wherein the RAN workloads comprise long-term evolution (LTE) and 5G physical layer signal processing workloads.

24. The non-transitory machine-readable medium of claim 17, wherein the particular type of instructions comprises at least one of: AVX-512 instructions and 5G instructions.

* * * * *